United States Patent
Tadokoro et al.

(10) Patent No.: US 6,577,325 B1
(45) Date of Patent: Jun. 10, 2003

(54) RECORDING MEDIUM LIBRARY APPARATUS AND METHOD FOR OPERATING THE SAME

(75) Inventors: Keiji Tadokoro, Kanagawa (JP); Masato Yokota, Kanagawa (JP); Nobuhiro Tsurumaki, Kanagawa (JP); Toru Yumine, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/459,125

(22) Filed: Dec. 10, 1999

Related U.S. Application Data

(63) Continuation of application No. PCT/JP99/01878, filed on Apr. 8, 1999.

(30) Foreign Application Priority Data

| Apr. 10, 1998 | (JP) | 10-098680 |
| Apr. 10, 1998 | (JP) | 10-098681 |
| Jun. 11, 1998 | (JP) | 10-163981 |

(51) Int. Cl.[7] .............................................. G06F 3/00
(52) U.S. Cl. ........................ 345/716; 345/727; 345/730; 369/30; 369/33
(58) Field of Search ................................ 345/716, 700, 345/727, 730, 771, 773, 839, 965, 339; 369/30, 33, 69

(56) References Cited

U.S. PATENT DOCUMENTS

| 5,416,914 A |   | 5/1995  | Korngiebel et al. ........ 711/114 |
| 5,528,746 A | * | 6/1996  | Yumine et al. ............. 345/161 |
| 5,850,539 A | * | 12/1998 | Cook et al. ................. 395/500 |
| 5,926,624 A | * | 7/1999  | Katz et al. ............. 395/200.47 |
| 5,956,665 A | * | 9/1999  | Martinez et al. ............ 702/188 |
| 5,991,759 A | * | 11/1999 | Knobblock et al. .......... 707/10 |
| 6,023,705 A | * | 2/2000  | Bellinger et al. ........... 707/200 |

FOREIGN PATENT DOCUMENTS

| EP | 0 680 045 | 11/1995 | .......... G11B/27/00 |
| JP | 6-150483  | 5/1994  | .......... G11B/15/68 |
| JP | 8-73010   | 3/1996  | .......... B65G/1/137 |
| JP | 9-55009   | 2/1997  | .......... G11B/17/22 |

* cited by examiner

*Primary Examiner*—Raymond J. Bayerl
*Assistant Examiner*—Cuong T. Thai
(74) *Attorney, Agent, or Firm*—Frommer Lawrence & Haug LLP; William S. Frommer; Darren M. Simon

(57) ABSTRACT

A recording medium library apparatus made up of a combination of units and capable of readily outputting information representing the configuration and readily collecting management information. A library controller of a recording medium library apparatus recognizes the configuration of a library. Based on the information on the recognized configuration, a status monitoring view showing the actual arrangement of consoles is provided on a display. Part of the statuses of the sections are displayed on the status monitoring view. The library controller collects system information as management information sorted according to the functions or structural part of the library for each function or structure block element and rearranges the collected system information into data in a form which can be outputted all at a time, and the data is recorded as a system information file on, for example, a hard disk.

8 Claims, 38 Drawing Sheets

Bin Data

```
date, time       version of OS of library controller
*******************************
console composition
*******************************
(information on type of cassette library)
(information on console composition)

*******************************
version of library controller
*******************************
(version of whole library controller)
(version of each program module)

*******************************
version of console control system
*******************************
(version of console control unit and result of self diagnosis)
(version of other board and result of self diagnosis)

*******************************
version of drive control system
*******************************
(version of main drive control unit)
(version of drive control unit)

*******************************
serial number of driving apparatus
*******************************
(serial number of driving apparatus)
```

FIG.44

```
*********************************
version of firmware of driving apparatus
*********************************
(version of firmware of driving apparatus)

*********************************
position correction of carrying system
*********************************
(position correction of carrying system)

*********************************
console coordinates
*********************************
(console coordinates)

*********************************
working time of carrying system
*********************************
(working time information and the number of accesses made
   by cassette carrier of each console line, working time
   information of input/output port, working time information
   of junction port)

*********************************
working time of driving apparatus
*********************************
(working time information of driving apparatus)

*********************************
setup information of library controller
*********************************
(setup information of library controller)
```

FIG.45

RECORDING MEDIUM LIBRARY APPARATUS AND METHOD FOR OPERATING THE SAME

This is a continuation of copending International Application PCT/JP99/01878 having an international filing date of Apr. 8, 1999.

TECHNICAL FIELD

The present invention relates to a recording medium library apparatus constructed by combining a plurality of units including a housing unit for housing recording media and a method of operating the apparatus.

BACKGROUND ART

There has long been a system which houses a plurality of recording media (cassette tapes or disk-shaped recording media, for example) loadable/unloadable to/from a recording and reproducing apparatus and records various information onto the housed recording media and reproduces the recorded information as necessary. Such a system is called a library system, auto-changer, or the like. In the following description, it will be called a library system.

Some library systems have predetermined compositions. Other library systems have compositions which can be adapted to a certain degree to suit the user. An example of the latter library systems has a plurality of consoles connected to one another so as to be able to change the position thereof. The consoles are combined freely to form library systems of various sizes and arrangements. Examples of the consoles are a console for recording and reproduction and a console for housing recording media. A console for recording and reproduction has a recording and reproducing apparatus which records and reproduces information onto/from a recording medium. A console for housing recording media has a plurality of housing sections, each capable of housing a recording medium. Some consoles for recording and reproduction further comprise a plurality of housing sections, each capable of housing a recording medium. Moreover, the latter library system comprises a carrier apparatus and a control unit. The carrier apparatus carries a recording medium between any one of the housing sections and the recording and reproducing apparatus. The control unit controls the recording and reproducing apparatus and the carrier apparatus.

A library system may display an image of the composition of the system and the status of each part of the system on a display device attached to the control unit. In this case, for easy interpretation by the user, a possible method is to display an image which closely represents the actual arrangement of consoles.

When displaying such an image, in the case of the former library system, it is possible to prepare main parts of the image in advance. This preparation, however, is not possible in the case of the latter library system, which leads to the conclusion that it is difficult to display such an image on the latter library system.

Also, the system management of a library system may require management information on each of a plurality of blocks classified according to functions or components of the system. Among such management information are version information of a recording and reproducing apparatus or other apparatuses as components of the system, and version information of software and firmware which provides a program to realize the function of controlling the system. In a conventional library system, such management information has to be obtained item by item. For example, management information has to be checked block by block, written down in longhand. This is a cumbersome task and likely to cause errors in obtaining management information.

Moreover, when a failure occurs in the system, it is necessary to analyze the failure through analyzing the past operation progression information (log) on the system. The analysis may require management information such as the version of each block, but it is often impossible to obtain sufficient and accurate management information for the above-mentioned reason. In consequence, it takes a very long time to analyze the failure.

DISCLOSURE OF INVENTION

The invention has been achieved in consideration of the above-described problems. It is an object of the invention to provide a recording medium library apparatus which is configured by combining a plurality of units and can readily output information on the composition of the apparatus itself and a method of operating the recording medium library apparatus.

Another object of the invention is to provide a recording medium library apparatus capable of readily obtaining a plurality of items of management information on such a recording medium library apparatus in an integrated manner and a method of operating the recording medium library apparatus.

A recording medium library apparatus according to the invention comprises: a unit combination constituted by combining a plurality of kinds of units including a unit having recording and reproducing means for performing at least either recording or reproduction of information by using a removable recording medium and a unit having a plurality of housing sections in which the recording medium can be housed, the units being connected to one another so as to be able to change the position thereof; carrying means for carrying the recording medium between any one of the housing sections in the unit combination and the recording and reproducing means; and control means for controlling the recording and reproducing means and the carrying means and performing various information processing related to the working of the whole apparatus.

The recording medium library apparatus of the invention can be constructed so that the control means recognizes an apparatus composition including the kind of each unit constructing the unit combination and the connection between the units and outputs an image representing the recognized apparatus composition. In this case, display means capable of displaying information may be further provided and the control means may output an image representing the apparatus composition to the display means and allow the display means to selectively display the image in a plurality of display manners. The display manners can include display manners whereby the size of the images of the units varies. The display manners may include display manners whereby an image of the logical composition of the units is displayed and display manners whereby an image of the physical composition of the units is displayed. The display manners whereby an image of the physical composition of the units is displayed may include display manners whereby the unit arrangement direction varies.

The recording medium library apparatus of the invention can be constructed so that the control means further recognizes the status of each of the recording and reproducing means, the housing sections and the carrying means, and outputs at least a part of information on the recognized status together with the image representing the apparatus composition. In this case, display means capable of displaying information may be further provided and the control means may output the image representing the apparatus composition to the display means and allow the display means to selectively display at least either the image or the status in a plurality of display manners.

The recording medium library apparatus of the invention can be also constructed so that the control means further recognizes the status of each of the recording and reproducing means, the housing sections and the carrying means and, in response to a designation of a position in the image representing the apparatus composition, outputs detailed information on the status related to the designated position.

The recording medium library apparatus of the invention can be also constructed so that the units forming the unit combination comprises: a basic console having an input/output port for importing a removable recording medium to the inside or exporting the recording medium to the outside; a housing console having a plurality of rack openings for housing the recording medium; a drive console having at least one recording and reproducing means capable of performing at least either recording or reproduction of information by using a recording medium; and a junction console having a transfer port for transferring the recording medium from a first direction to a second direction. The carrying means can be constructed so as to selectively carry the recording medium imported via the input/output port among the rack openings, the recording and reproducing means and the transfer port. The control means can be constructed so as to control the carrying means, recognize the apparatus composition including the kind of the basic console, housing console, drive console and junction console and the connection between the consoles, and output an image representing the apparatus composition. In this case, display means capable of displaying information may be further provided and the control means may output the image to the display means and allow the display means to selectively display the image in a plurality of display manners. The control means may further recognize the status of each of the consoles and, in response to a designation of a position in the image, output detailed information on the status of the designated console to the display means, and allow the display means to display the detailed information on the status of the console together with the image.

The recording medium library apparatus of the invention can be also constructed so that the control means collects a plurality of items of management information classified according to functions of the recording medium library apparatus itself or components and puts the collected management information together into information in a form which can be integrally outputted. In this case, the control means may obtain log of the recording medium library apparatus itself and attach the management information put together into information in a form which can be integrally outputted to the log obtained.

A method of operating a recording medium library apparatus of the invention comprising: a unit combination constituted by combining a plurality of kinds of units including a unit having recording and reproducing means for performing at least either recording or reproduction of information by using a removable recording medium and a unit having a plurality of housing sections in which the recording medium can be housed, the units being connected to one another so as to be able to change the position thereof, and carrying means for carrying the recording medium between any one of the housing sections and the recording and reproducing means in the unit combination, the method comprises: a control step of controlling the recording and reproducing means and the carrying means; and an information processing step of performing various information processing related to the working of the whole apparatus.

In the recording medium library apparatus and the method of operating the apparatus according to the invention, the apparatus composition including the kind of each device and the connection between the devices is recognized and an image representing the recognized composition is outputted by the control means.

Other objects, features and advantages of the invention will appear more fully from the following description.

BRIEF DESCRIPTION OF DRAWINGS

FIGS. 11A to 11C are explanatory diagrams for explaining information held by a composition information transmitting unit of each console shown in FIG. 10 and an example of a method of transmitting the information to a basic control unit.

FIG. 44 is an explanatory representation of an example of a data structure of the system information file created by the library controller illustrated in FIG. 1.

FIG. 45 is an explanatory representation of the data structure continued from the system information file shown in FIG. 44.

BEST MODE FOR CARRYING OUT THE INVENTION

Embodiments of the invention will be described in detail hereinbelow with reference to the drawings.

Figure 1:
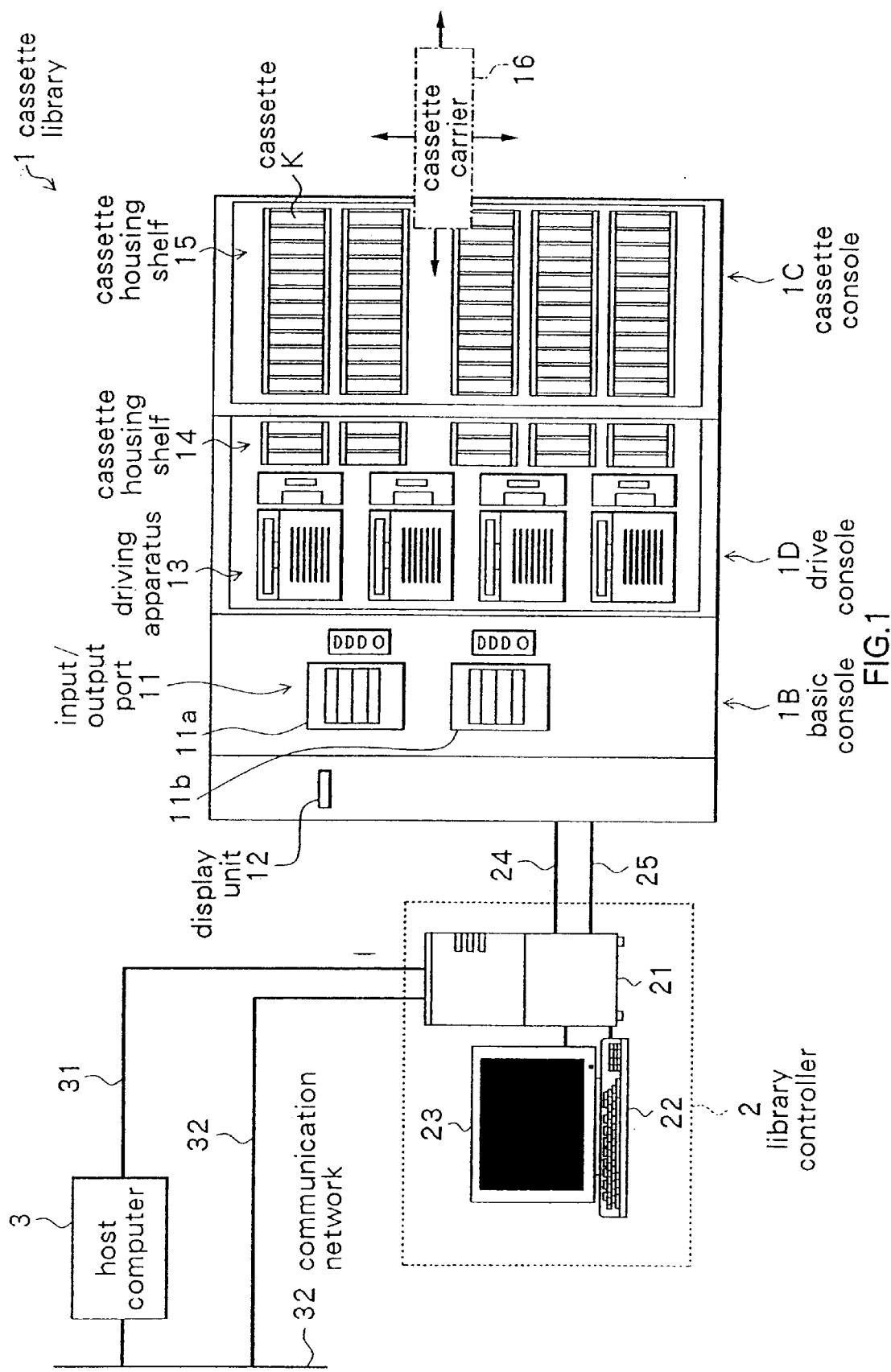
FIG. 1 is a front view showing a basic composition of a library system according to an embodiment of the invention.
Figure 2:
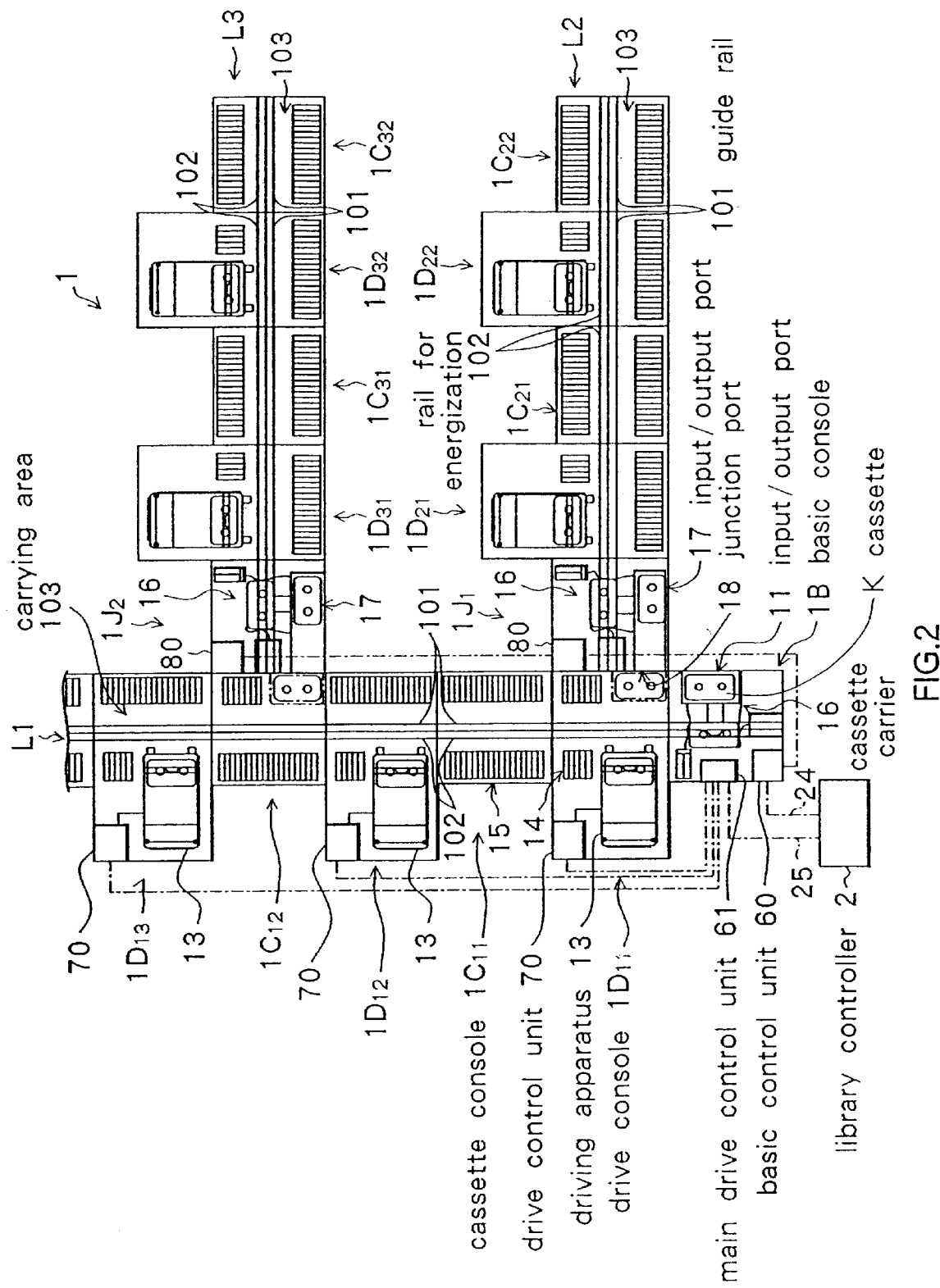
FIG. 2 is a plan view showing an example of an overall composition of a cassette library illustrated in FIG. 1.

FIGS. 1 and 2 are schematic illustrations of a library system as a recording medium library apparatus according to an embodiment of the invention. FIG. 1 is a front view of a basic composition of a library system according to the embodiment. FIG. 2 is a plan view showing an overall composition of a cassette library 1 illustrated in FIG. 1.

The library system according to the embodiment comprises the cassette library 1 and a library controller 2 for controlling the cassette library 1. The cassette library 1 houses a plurality of video tape cassettes (hereinbelow, simply referred to as cassettes) K as recording media, and records and reproduces information on demand by using any one of the cassettes K housed therein.

The library controller 2 comprises: a controller body 21 as an apparatus for controlling the cassette library 1; an input device 22 including a mouse or a keyboard for inputting information necessary for control, giving instructions or other requests to the controller body 21; and a display device 23 connected to the controller body 21 and having a display screen for displaying information or other various messages associated with the control. The controller body 21 is connected to the cassette library 1 by transmission lines 24 and 25 of, for example, the RS-232C standard. The controller body 21 can be connected to a host computer 3 as a client who uses the cassette library 1, by a transmission line 31 of, for example, the SCSI (Small Computer System Interface) standard. The controller body 21 can be also connected to the host computer 3 via a communication network 32 of a predetermined standard such as Ethernet.

The cassette library 1 comprises four kinds of consoles, namely, a basic console 1B, a drive console 1D, a cassette console 1C and a junction console 1J. The cassette library 1 also comprises a cassette carrier 16 for carrying a cassette K in the cassette library 1. The four kinds of consoles are selectively connected to one another so as to be able to change the position thereof. The cassette library 1 can have various library compositions, comprising part or all of the four kinds of consoles. A minimum of components of the cassette library 1 necessary to realize the library system are the basic console 1B and the drive console 1D.

FIG. 1 shows only an example of basic compositions of the cassette library 1. As shown in FIG. 1, one side face of the drive console 1D is connected to one side face of the basic console 1B and one side face of the cassette console 1C is connected to another side face of the drive console 1D. The cassette library shown in FIG. 2 comprises a console line L1 as a base, and console lines L2 and L3. The console line L1 comprises alternate drive consoles 1D ($1D_{11}$, $1D_{12}$, . . . ) and cassette consoles 1C ($1C_{11}$, $1C_{12}$, . . . ) connected with each other in a line extending from one side face of the basic console 1B in the order named. The console line L2 comprises alternate drive consoles 1D ($1D_{21}$, $1D_{22}$, . . . ) and cassette consoles 1C ($1C_{21}$, $1C_{22}$, . . . )

connected with each other in a line extending from the front face of the drive console $1D_{11}$ with a junction console $1J_1$ connected in between. The console line L3 comprises alternate drive consoles 1D ($1D_{31}$, $1D_{32}$, . . . ) and cassette consoles 1C ($1C_{31}$, $1C_{32}$, . . . ) connected with each other in a line extending from the front face of the cassette console $1C_{12}$ with a junction console $1J_2$ connected in between. As shown in FIG. 2, in the case in which there are provided a plurality of console lines, each of the console lines is mounted with an associated cassette carrier 16. The cassette K is transferred between two console lines via a junction port 18 in the junction console 1J.

The connection between the consoles is not limited to that shown in FIGS. 1 and 2. For example, even a cassette library with the composition in which only the basic console 1B and the drive console 1D are connected can perform basic functions of a library system.

In the cassette library 1, the drive console 1D has a plurality of (for example, four) driving apparatuses 13 and a cassette housing shelf 14. The driving apparatuses 13 work as recording and reproducing means for recording and reproducing information to/from the cassette K. The cassette housing shelf 14 has a plurality of housing sections and can house a plurality of cassettes K. The drive console 1D also has a drive control unit 70 (see FIG. 2) for controlling the driving apparatuses 13. The cassette console 1C has a cassette housing shelf 15 which has a plurality of housing sections and can house a plurality of cassettes K. The cassette housing shelves 14 and 15 are partially detached so that the cassette K can be received/transferred from/to the junction console 1J when the junction console 1J is connected to the drive console 1D and the cassette console 1C.

The basic console 1B comprises an input/output port 11 and a display unit 12. The input/output port 11 imports the cassette K from the outside of the library into the library and automatically exports the cassette K in the library to the outside. The display unit 12 is provided on the front face of the basic console 1B and displays various information such as control information regarding the cassette library 1. The input/output port 11 is comprised of an upper port 11a provided on the upper stage of the basic console 1B and a lower port 11b provided on the lower stage. The upper and lower ports 11a and 11b are provided for the purposes of loading and ejecting the cassette K, each having a plurality of (for instance, four) input/output ports. The display unit 12 takes the form of, for instance, a liquid crystal display device. The basic console 1B further comprises a basic control unit 60 (see FIG. 2) and a main drive control unit 61 (see FIG. 2). The basic control unit 60 is connected to the controller body 21 of the library controller 2 by the transmission line 24. The main drive control unit 61 is connected to the drive control unit 70. The main drive control unit 61 is also connected to the controller body 21 by the transmission line 25.

The junction console 1J is used to extend the connection between the consoles, one side face thereof being connectable to the front face or rear face of another console. As shown in FIG. 2, on one side face of the junction console 1J, provided is a junction port 18 having the mechanism of transferring the cassette K to/from other consoles connected. The junction port 18 occupies a position opposite to the upper port 11a in the basic console 1B. On the front face of the junction console 1J, provided is an input/output port 17 having the function similar to that of the input/output port 11 of the basic console 1B. The input/output port 17 takes up a position opposite to the lower port 11b in the basic console 1B. The junction console 1J also has a basic control unit 80 for controlling the mechanism of transferring the cassette K in the junction port 18 and controlling the cassette carrier 16 or other components in an extended console line. The basic control unit 80 is electrically connected to the basic control unit 60 in the basic console 1B. Otherwise, the basic composition of the junction console 1J is similar to that of the basic console 1B.

In the center part of each of the basic console 1B, drive console 1D, cassette console 1C and junction console 1J, as shown in FIG. 2, provided is a carrying area 103 as a space for travel of the cassette carrier 16. In the carrying area 103, a guide rail 101 as a carriage path for travel of the cassette carrier 16 is laid in the direction in which the cassette carrier 16 is carried. Further, on a side of the guide rail 101, provided is a rail 102 for energization for supplying the cassette carrier 16 with power.

The cassette carrier 16 is capable of horizontal movements, in the carrying area 103, along the guide rail 101 while holding the cassette K, with power supplied by the rail 102 for energization. The cassette carrier 16 is also capable of vertical (up-and-down) movements in the consoles by a vertical movement mechanism (not shown) while holding the cassette K. Moreover, the cassette carrier 16 has a mechanism of transferring the cassette K to/from each console. For example, the cassette carrier 16 can carry the cassette K imported via the input/output port 11 in the basic console 1B for delivery to the cassette housing shelf 15 in the cassette console 1C. The cassette carrier 16 also has a bar code reading apparatus (not shown) for reading bar code information on 1D (identification information) given to the imported cassette K.

Figure 3:
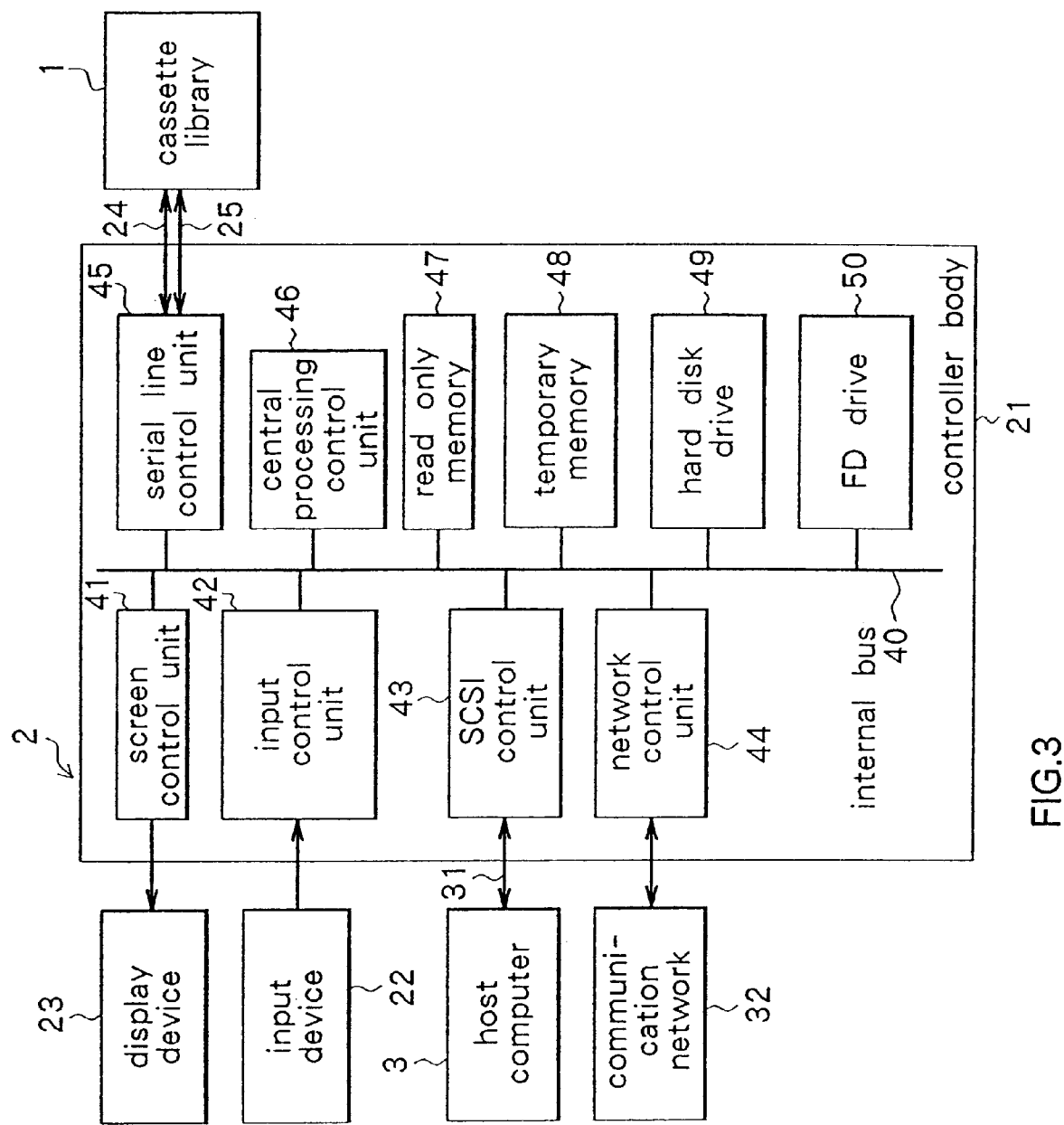
FIG. 3 is a block diagram showing a circuit composition of a library controller illustrated in FIG. 1.

FIG. 3 is a block diagram showing the circuit composition of the library controller 2. The controller body 21 of the library controller 2 comprises a screen control unit 41 for controlling the display device 23, an input control unit 42 for controlling the input device 22, an SCSI control unit 43 for executing control to connect the host computer 3 to the library controller 2 in the SCSI standard by the transmission line 31, and a network control unit 44 for performing control to connect the communication network 32 to the library controller 2. The components in the controller body 21 are connected to each other via an internal bus 40.

The library controller 2 also comprises, for example: a serial line control unit 45 for performing control to connect the cassette library 1 to the library controller 2 by the transmission lines 24 and 25 of, for example, the RS-232C standard; a central processing control unit 46 including a CPU (central processing unit) and the like, for executing control of the whole library controller 2 and substantial control of the cassette library 1; a read only memory 47 which stores a basic program and the like necessary to perform a basic operation of the library controller 2 itself; a temporary memory 48 serving, for example, as a work area used when the central processing control unit 46 executes a program; a hard disk drive 49 for driving a built-in hard disk for storing various information such as a database regarding system information of the library system; and a floppy disk (written as "FD" in the figure) drive 50 for recording and reproducing information to/from a floppy disk. A program for controlling the cassette library 1 is stored in the hard disk driven by the hard disk drive 49. The central processing control unit 46 executes the program, thereby realizing the function of controlling the cassette library 1.

Figure 4:
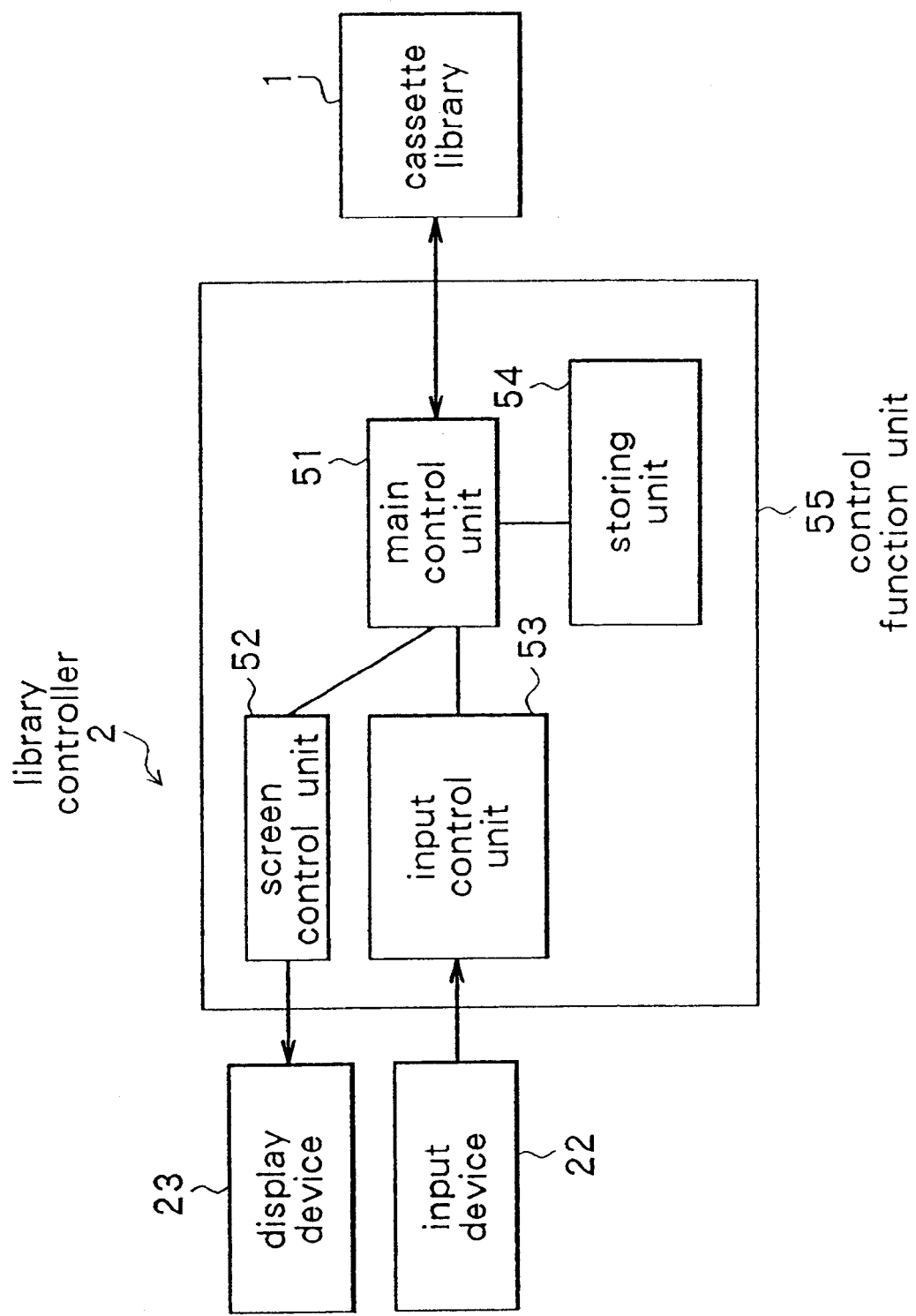
FIG. 4 is a block diagram showing a functional composition of the library controller illustrated in FIG. 1.

FIG. 4 is a block diagram showing a main part of the functional composition of the library controller 2. The library controller 2 comprises a control function unit 55 having the function of controlling the input device 22, the display device 23 and the cassette library 1. The control function unit 55 comprises: a main control unit 51 having the function of performing control of the whole library controller 2 and substantial control of the cassette library 1; a screen control unit 52 which is connected to the main control unit 51 and functions to control the display device 23; an input control unit 53 which is connected to the main control unit 51 and functions to control the input device 22; and a storing unit 54 having the function of storing various information such as a database regarding system information of the library system.

Figure 5:
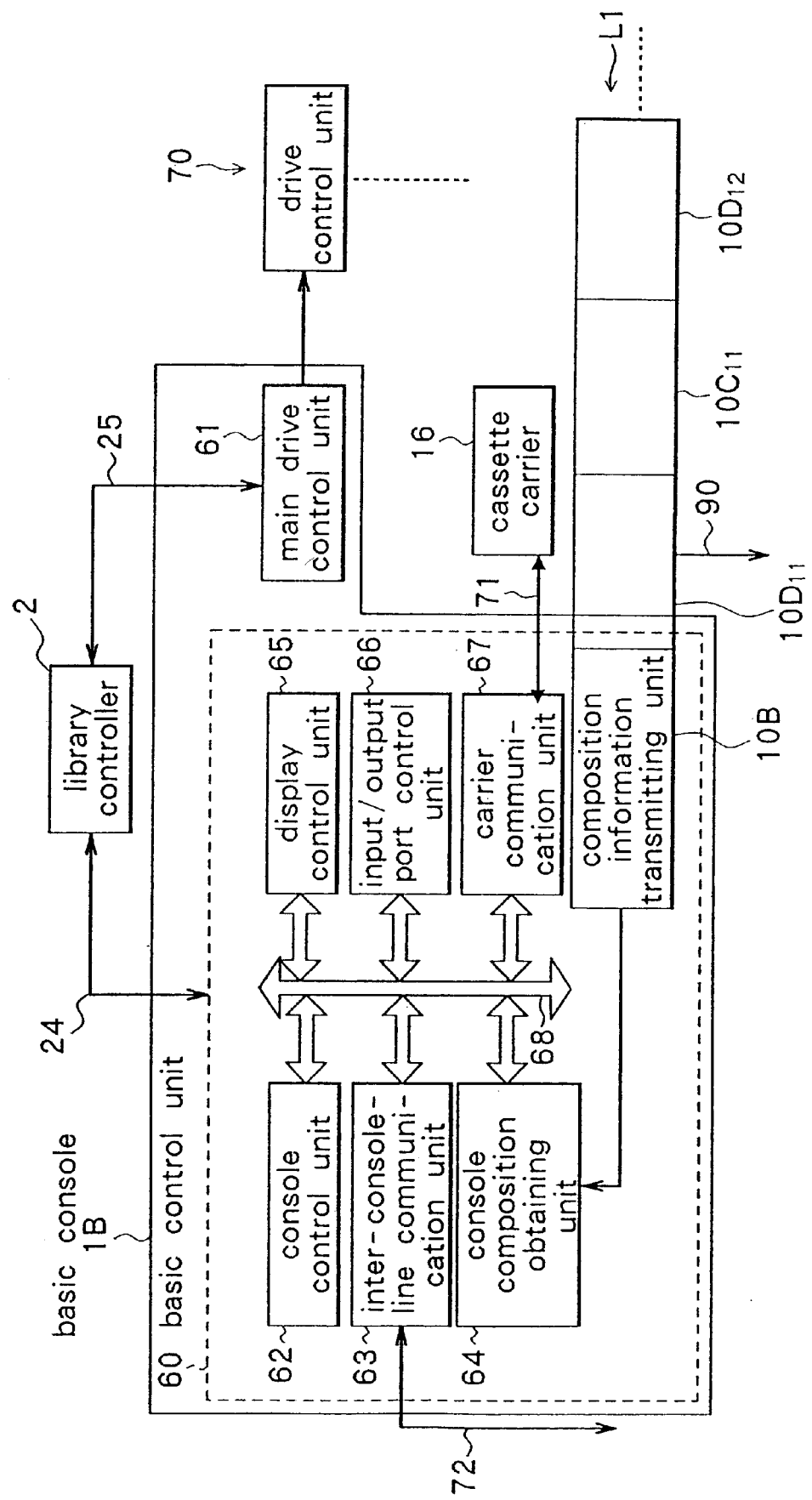
FIG. 5 is a block diagram showing a circuit composition of a basic console illustrated in FIG. 1.

FIG. 5 is a block diagram showing the circuit composition of the basic console 1B. The basic console 1B has: the basic control unit 60 connected to the controller body 21 of the library controller 2 by the transmission line 24, for executing control of the basic console 1B itself, control of the cassette carrier 16, and control of other components; and the main drive control unit 61 which is connected to the controller body 21 of the library controller 2 by the transmission line 25 and connected to the drive control unit 70 in the drive console 1D, for allowing the drive control unit 70 to control the driving apparatus 13. The main drive control unit 61 is realized by, for example, a microcomputer.

The basic control unit 60 comprises: a console control unit 62 for executing control of each of the components in the basic control unit 60, control of the cassette carrier 16, and control of other components; an inter-console-line communication unit 63 for carrying out communications with the extended console lines L2 and L3 via a communication line 72; a console composition obtaining unit 64 for obtaining information on, for example, the composition of each of the consoles which form the console line L1 as a base, the console line L1 including the basic console 1B; a display control unit 65 for performing display control of the display unit 12 (see FIG. 1) provided on the front face of the basic console 1B; an input/output port control unit 66 for executing control of the mechanism of transferring the cassette K in the input/output port 11 (see FIG. 1) provided on the front face of the basic console 1B; and a carrier communication unit 67 for performing communication for control with the cassette carrier 16 by using infrared rays 71. The components of the basic control unit 60 are connected to each other via an internal bus 68. The console control unit 62 is realized by, for example, a microcomputer.

The console composition obtaining unit 64 obtains information on, for example, the composition of each of the consoles which form the console line L1 as a base from composition information transmitting units 10B, $10D_{11}$, $10C_{11}$, $10D_{12}$, . . . . of the respective consoles.

The console control unit 62 transmits information on the composition of the consoles in the console line L1 as a base obtained by the console composition obtaining unit 64 to the library controller 2 via the internal bus 68. The console control unit 62 also transmits information on the composition of the consoles in other console lines received via the inter-console-line communication unit 63 and other information to the library controller 2 via the internal bus 68. Information transmitted from the console control unit 62 is obtained as, for example, system information used when the library controller 2 executes a process of creating a system information file. The details of a system information file and the process of creating the file will be described hereinlater.

Figure 6:
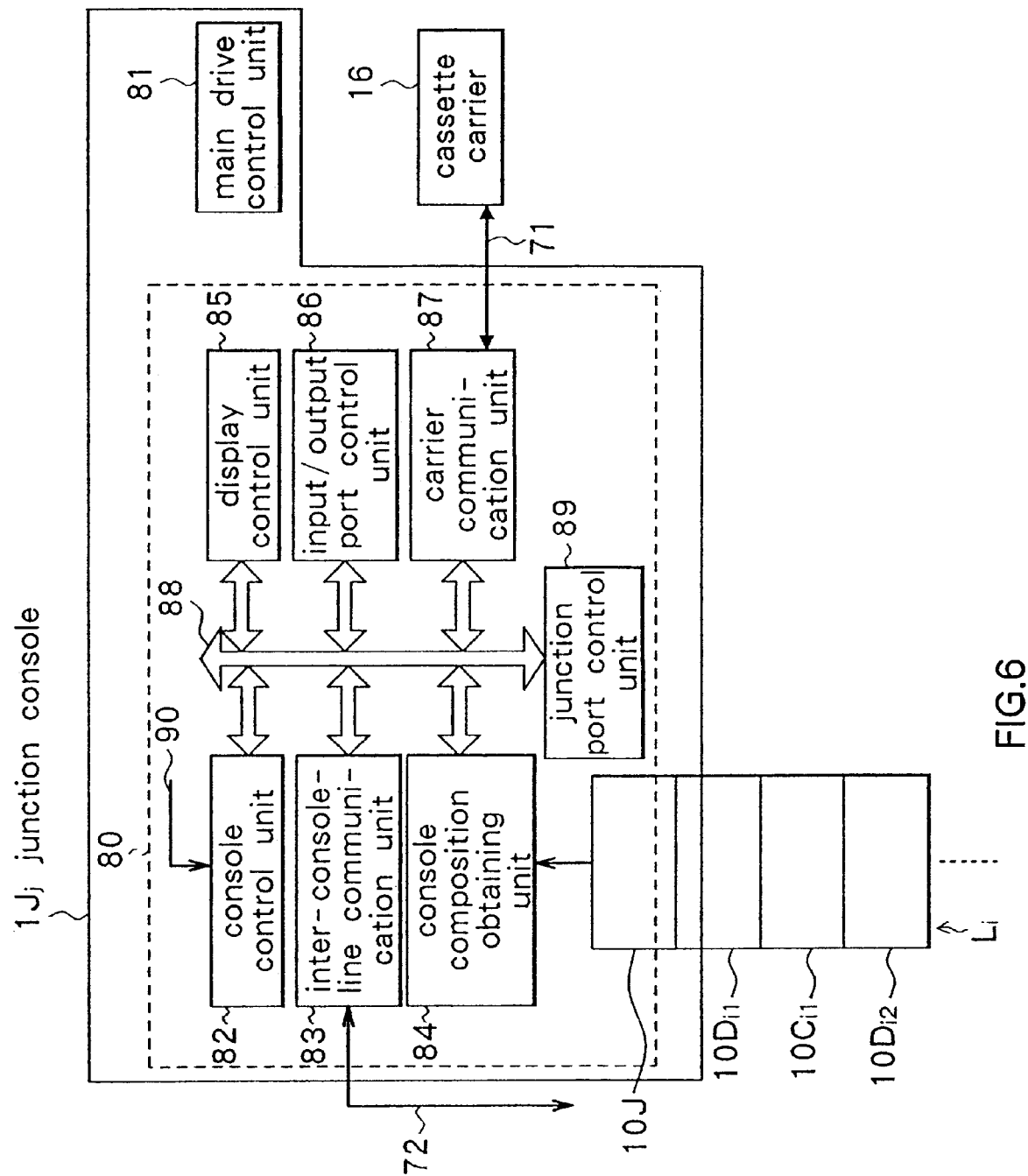
FIG. 6 is a block diagram showing a circuit composition of a junction console illustrated in FIG. 1.

FIG. 6 is a block diagram showing a circuit composition of the junction console $1J_j$ (d=1, 2). The junction console $1J_j$ has the basic control unit 80 for performing control of the junction console $1J_j$ itself, control of the cassette carrier 16 in the console lines Li (i=2, 3) extended by the junction console $1J_j$, and control of other components; and a main drive control unit 81 for allowing the drive control unit 70 to control the driving apparatus 13 in a console line extended by the junction console $1J_j$ as necessary. The main drive control unit 81 is used to interface between the main drive control unit 61 of the basic console 1B and the drive control units 70 in a plurality of drive consoles 1D when a number of drive consoles 1D are used.

The basic control unit 80 has a console control unit 82, an interconsole-line communication unit 83, a console composition obtaining unit 84, a display control unit 85, an input/output port control unit 86, and a carrier communication unit 87. The console composition obtaining unit 84 obtains information on, for example, the composition of the consoles which form the extended console line Li from the composition information transmitting units 10J, $10D_{i1}$, $10C_{i1}$, $10D_{i2}$, . . . . of the respective consoles. The basic control unit 80 also has a junction port control unit 89 for controlling the mechanism of transferring the cassette K in the junction port 18 (see FIG. 2) provided on the side face of the junction console 1J. The components of the basic control unit 80 are connected to each other via an internal bus 88. The components of the basic control unit 80 except for the junction port control unit 89 have the functions basically similar to those of the components of the basic control unit 60 in the basic console 1B.

Information on the composition is transmitted to the console control unit 82 from the composition information transmitting units of the consoles in the other console line (the console line L1 in the example of FIG. 2) to which the junction console $1J_j$ is connected. For example, in the case of the junction console $1J_1$, information 90 on the composition is transmitted from the composition information transmitting unit $10D_{11}$ in the drive console $1D_{11}$ shown in FIG. 5 to the console control unit 82 shown in FIG. 6. Thus, the connection between the console lines can be recognized.

In the library system according to the embodiment, the library controller 2 controls the whole cassette library 1 including the driving apparatus 13 and the cassette carrier 16. In the embodiment, especially, the library controller 2 has the function of recognizing the composition of the cassette library 1 including the kind of each console and the connection between the consoles which form the cassette library 1, and outputting an image representing the recognized composition. When outputting the image representing the composition, the library controller 2 can selectively display the image in a plurality of display manners whereby the size of the display images of the consoles varies.

The library controller 2 further has the function of recognizing the status of each of the parts of the cassette library 1 including the driving apparatus 13, housing sections and cassette carrier 16, and outputting at least part of information on the recognized status, together with the image representing the composition. When outputting the image representing the composition, the library controller 2 can selectively display at least either the image or the status in a plurality of display manners.

The library controller 2 further has the function of outputting detailed information on status related to a designated position in response to a designation of a predetermined position in the image representing the composition. The library controller 2 further has the function of collecting system information as a plurality of items of management information classified according to functions or components of the library system for each function or component and putting the collected system information together into a system information file as information which can be outputted in a integrated manner.

In other words, the library controller 2 performs the process of creating a system information file through collecting system information as a plurality of items of management information classified according to functions or components of the library system for each function or component, rearranging the collected system information into data in a form which can be outputted in a integrated manner, and recording the data as a system information file onto, for example, a hard disk.

The process of creating a system information file by the library controller 2 allows a plurality of items of system information to be rearranged into a system information file. The user can refer to data of a system information file recorded on a hard disk through, for example, displaying the data on the display device 23 for the purpose of system management as necessary.

The operation of the library system with a composition as described above will now be described. First, the operation of the whole library system will be described.

Figure 7:
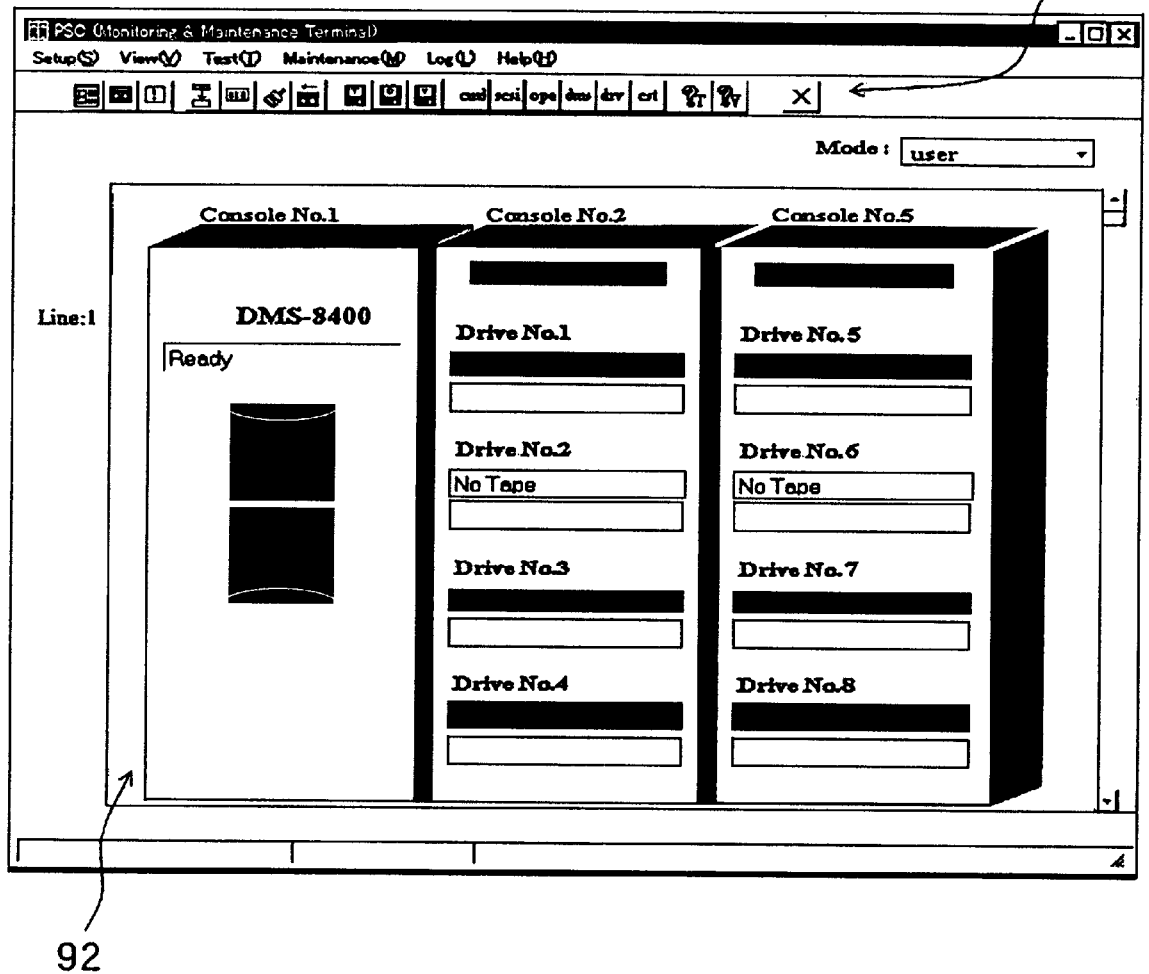
FIG. 7 is an explanatory representation of a main view for control displayed in the library controller illustrated in FIG. 1.

When the library controller 2 is activated, the main view for control under use of a GUI as shown in FIG. 7 is displayed on the display device 23 of the library controller 2. The user can make various settings to control the library system with a mouse or others on the displayed main view for control.

The library controller 2 transmits a command to move a desired cassette K among the input/output port 11 in the basic console 1B, the cassette housing shelf 15 in the cassette console 1C, the driving apparatus 13 in the drive console 1D and other components by using the cassette carrier 16, and a command to record or reproduce information in the driving apparatus 13 in the drive console 1D, to the basic console 1B in the cassette library 1 in response to a request from the host computer 3. The command to move the cassette K by using the cassette carrier 16 is transmitted to the basic control unit 60 in the basic console 1B via the transmission line 24. The command to make the driving apparatus 13 record or reproduce information is transmitted to the main drive control unit 61 in the basic console 1B via the transmission line 25.

The basic control unit 60 controls the cassette carrier 16 on the basis of the command received from the library controller 2 via the transmission line 24. The control of the basic control unit 60 over the cassette carrier 16 is executed by using infrared communications via the carrier communication unit 67 (see FIG. 5). Under the control of the basic control unit 60, the cassette carrier 16 carries the cassette K; for example, the cassette carrier 16 carries the cassette K loaded from the input/output port 11 in the basic console 1B for delivery to the cassette housing shelf 15 in the cassette console 1C. In a console line extended by the junction console 1J, the basic control unit 80 in the junction console 1J receives a command, which is transmitted from the library controller 2, from the basic control unit 60 in the basic console 1B and controls the cassette carrier 16 in the extended console line in a manner similar to the basic control unit 60.

The main drive control unit 61 controls the drive control unit 70 in the drive console 1D to make the driving apparatus 13 record or reproduce information on the basis of the command received from the library controller 2 via the transmission line 25. The drive control unit 70 makes the driving apparatus 13 record or reproduce information under the control of the main drive control unit 61.

The function of outputting an image representing the composition, which is the characteristic of the embodiment, will now be described in detail. The following description also includes description of the method of operating the recording medium library apparatus according to the embodiment. In the embodiment, an image which closely represents the actual arrangement of consoles is displayed as an image representing the composition so that the user can easily, immediately grasp the composition of the cassette library 1 and the status of each part of the cassette library 1. In the embodiment, the image is called a status monitoring view.

Figure 8:
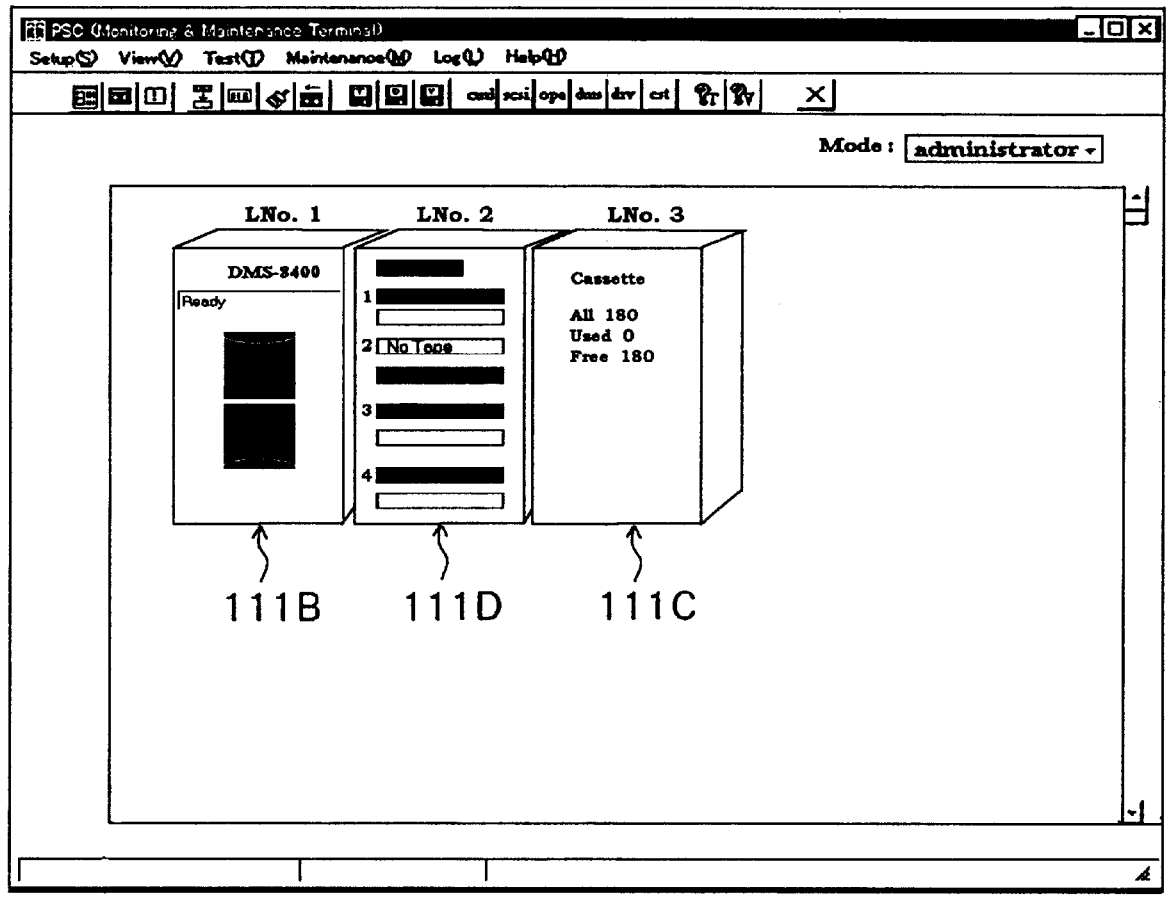
FIG. 8 is an explanatory representation of an example of a status monitoring view in the embodiment of the invention.

FIG. 8 shows an example of the status monitoring view. The example relates to a case where the cassette library 1 is comprised of three consoles, namely, the basic console 1B, the drive console 1D and the cassette console 1C. In FIG. 8, the reference characters 111B, 111D and 111C denote the display images of the basic console 1B, the drive console 1D and the cassette console 1C, respectively. In the cassette library 1 in the example, the basic console 1B, the drive console 1D and the cassette console 1C are arranged in a line in the order named. On the status monitoring view as well, the display images of the consoles are arranged in accordance with the actual arrangement of the consoles.

Figure 9:
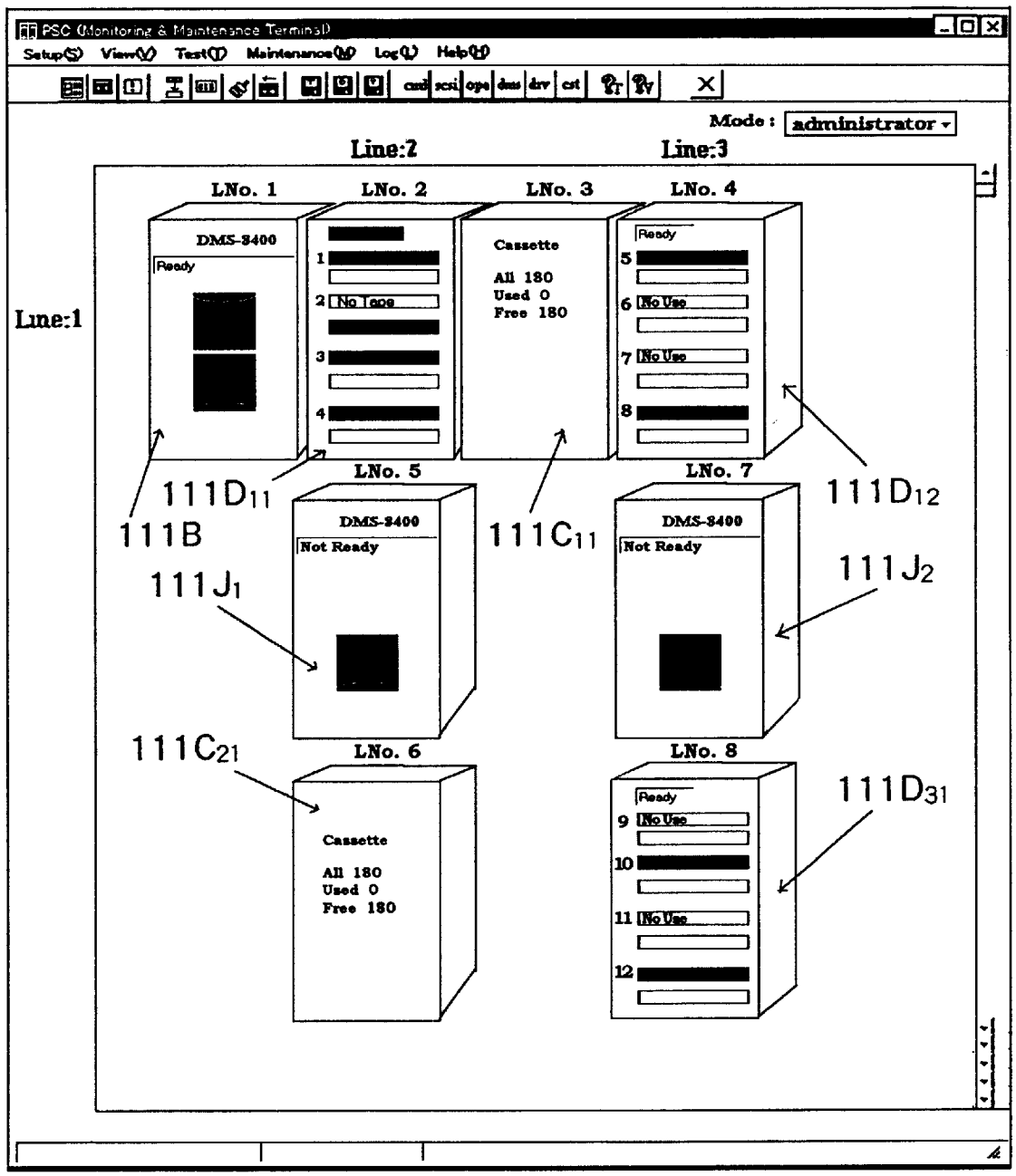
FIG. 9 is an explanatory representation of another example of the status monitoring view in the embodiment of the invention.

FIG. 9 shows another example of the status monitoring view. The example relates to a case where the cassette library 1 is comprised of eight consoles of three kinds, namely, the basic console 1B, three drive consoles 1D, two cassette consoles 1C, and two junction consoles 1J. In FIG. 9, the reference character 111B indicates the display image of the basic console 1B. The reference characters $111D_{11}$, $111D_{12}$ and $111D_{31}$ denote display images of the drive consoles 1D. The reference characters $111C_{11}$ and $111C_{21}$ denote display images of the cassette consoles 1C. The reference characters $111J_1$ and $111J_2$ represent display images of the junction consoles 1J. In the cassette library 1 in the example, the basic console 1B, the drive console 1D, the cassette console 1C and the drive console 1D are arranged in a line in the order named, thereby constructing the console line L1. The console line L2 is constructed by the junction console 1J connected to the drive console 1D next to the basic console 1B and the cassette console 1C connected to the junction console 1J. The console line L3 is constructed by the junction console 1J connected to the drive console 1D as the fourth console counting from the basic console 1B and the drive console 1D connected to the junction console 1J. On the status monitoring view as well, the display images of the consoles are arranged in accordance with the actual arrangement of the consoles. On the status monitoring view, the console lines L1 to L3 are shown by the characters of "Line: 1", "Line: 2" and "Line: 3", respectively.

Figure 10:
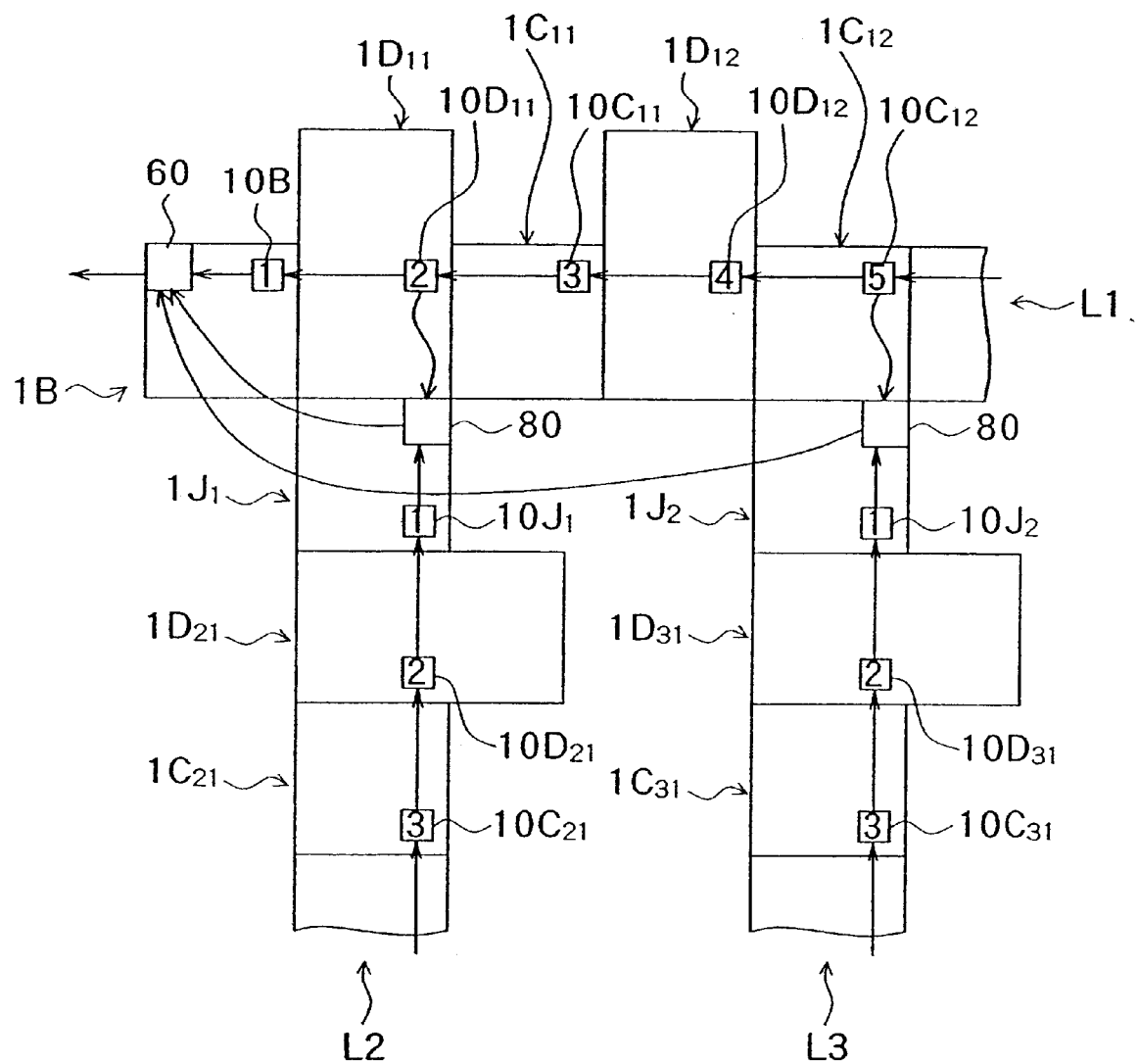
FIG. 10 is an explanatory diagram for explaining means for recognizing the composition of the cassette library in the embodiment of the invention.

As will be described in detail hereinlater, at least part of information on status of each part of the cassette library 1 is displayed in the display image of each console in the status monitoring view. Referring to FIG. 10, a process of recognizing the composition of the cassette library 1 including the kind of each console and connection between the consoles forming the cassette library 1 will be described. FIG. 10 schematically shows the consoles in the arrangement example illustrated in FIG. 2. As shown in the diagram, the consoles 1B, $1D_{11}$, $1D_{12}$, $1D_{21}$, $1D_{31}$, $1C_{11}$, $1C_{12}$, $1C_{21}$, $1C_{31}$, $1J_1$ and $1J_2$ have the composition information transmitting units 10B, $10D_{11}$, $10D_{12}$, $10D_{21}$, $10D_{31}$, $10C_{11}$, $10C_{12}$, $10C_{21}$, $10C_{31}$, $10J_1$ and $10J_2$, respectively. Each composition information transmitting unit holds information on the kind of the console including the unit itself and information on the console line as composition information and transmits the composition information to the basic control unit 60 in the basic console 1B or the basic control units 80 in the junction consoles $1J_1$ and $1J_2$. The composition information from the composition information transmitting unit of each of the consoles in the console line L1 is transmitted to the basic control unit 60 in the basic console 1B. The composition information from the composition information transmitting unit of each of the consoles in the console line L2 is transmitted to the basic control unit 80 in the junction console $1J_1$. The composition information from the composition information transmitting unit of each of the consoles in the console line L3 is transmitted to the basic control unit 80 in the junction console $1J_2$.

The basic control units 80 in the junction consoles $1J_1$ and $1J_2$ send the composition information transmitted from the composition information transmitting unit of each console to the basic control unit 60 in the basic console 1B via the communication line 72. The basic control unit 60 in the basic console 1B combines the composition information sent from the basic control units 80 in the junction consoles $1J_1$ and $1J_2$, and the composition information sent from the composition information transmitting units of the consoles in the console line L1. The combined information is sent to the library controller 2 via the transmission line 24.

The library controller 2 recognizes the composition of the cassette library 1 on the basis of the composition information sent from the basic control unit 60 and stores the information (hereinbelow, called console composition information) on the recognized composition of the cassette library 1 (hereinbelow, called a console composition) as a database onto the storing unit 54 (hard disk). The library controller 2 displays the status monitoring view on the display device 23 on the basis of the stored console composition information in a predetermined case.

Referring to FIGS. 11A to 11C, information stored by the composition information transmitting unit in each console and an example of a method of sending the information to the basic control units 60 and 80 will be described. Of FIGS. 11A to 11C, FIG. 11A shows information held by the composition information transmitting unit in each of the consoles in the console line L1. FIG. 11B shows information held by the composition information transmitting unit in each of the consoles in the console line L2. FIG. 11C shows information held by the composition information transmitting unit in each of the consoles in the console line L3. In the diagrams, "B" denotes the basic console. "D" and "D'" denote the drive consoles. In particular, "D'" denotes the drive console connected to the junction console 1J. "C" and "C'" indicate the cassette consoles. In particular, "C'" denotes the cassette console connected to the junction console 1J. "J" indicates the junction console. The information is set and held by, for example, a DIP switch. In FIGS. 11A to 11C, "0", "2" and "3" denote the console lines L1, L2 and L3, respectively. The information is set and held by, for example, a rotary switch.

The basic control unit 60 and the composition information transmitting units in the consoles in the console line L1 are connected by a signal line for transmitting a timing signal and a signal line for transmitting composition information. The basic control unit 60 sends a timing signal indicative of a timing of information transmission in a predetermined cycle via the signal line for timing signal transmission. The timing signal is transmitted from the basic control unit 60 one console after another at intervals equal to the cycle of the timing signal. When the timing signal is received, the composition information transmitting unit in each console transmits the composition information through the signal line for composition information transmission. In such a manner, the composition information from the composition information transmitting units in the consoles in the console line L1 is supplied to the basic control unit 60 in order at intervals equal to the cycle of the timing signal. Thereby, the basic control unit 60 can recognize the kind of each console and the connection between the consoles in the console line L1. The composition information is transimitted to the basic control unit 80 in a similar way to the above.

To the console control unit 82 in the basic control unit 80 in the junction console 1J, the composition information is transmitted from the composition information transmitting units in the consoles in the other console line to which the junction console 1J is connected. The basic control unit 80 can consequently recognize the console line, without setting the information on the console line in the composition information transmitting unit in the junction console 1J. The basic control unit 80 transmits the information on the console line recognized as described above as part of the composition information in the composition information transmitting unit of the basic control unit 80 itself to the basic control unit 60 in the basic console 1B. Thereby, the basic control unit 60 can recognize the connection among the console lines.

Figure 12:
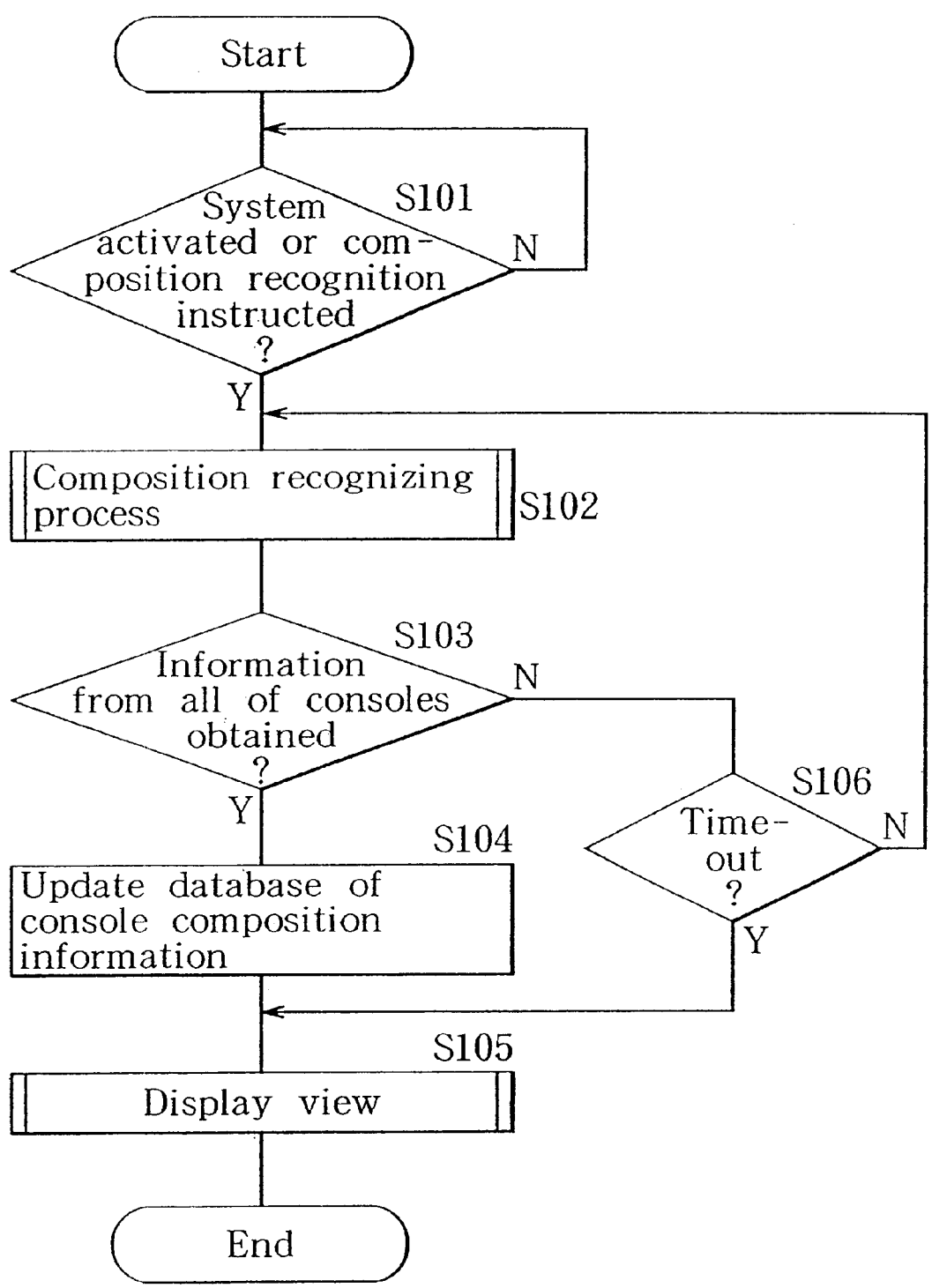
FIG. 12 is a flowchart for recognizing the console composition and for displaying the status monitoring view in the embodiment of the invention.

The operation for recognizing the console composition and displaying the status monitoring view in the library controller 2 will now be described by referring to the flowchart of FIG. 12. First, the library controller 2 determines whether or not the library system has been activated or the composition recognition has been instructed (step S101). The composition recognition instruction is given in such a manner that, for example, the user selects (clicks the left mouse button) the "Setup" option in the menu bar in an area 91 in the main view shown in FIG. 7 and then select the "Console Composition" option in the pull-down menu. If there is no activation of the library system or no composition recognition instruction (N), the determination of step S101 is repeated.

If the library system is activated or the composition recognition is instructed (step S101; Y), the library controller 2 performs the composition recognizing process (step S102). The composition recognizing process is a process of making the basic control units 60 and 80 collect the composition information from the composition information transmitting units of the consoles and recognizing the console composition on the basis of the collected information. Then the library controller 2 determines whether the composition information from all of the consoles is obtained or not (step S103). If the composition information from all of the consoles is obtained (Y), the database of the console composition information is updated (step S104). Then, the status monitoring view is displayed on the basis of the console composition information (step S105), and the operation is finished.

On the other hand, if the composition information from all of the consoles is not obtained (step S103; N), the library controller 2 determines whether a time-out occurs (a predetermined time has elapsed since the composition recognizing process started) or not (step S106). If no time-out occurs (N), the routine is returned to step S102 and the composition recognizing process is continued. If a time-out has occured (Y), the processing routine advances to step S105 where the status monitoring view is displayed (step S105) and the operation is finished. In this case, the status monitoring view is displayed on the basis of the previous console composition information.

According to the embodiment as described above, the library controller 2 automatically recognizes the console composition and displays the status monitoring view which closely represents the actual arrangement of the consoles. Consequently, in the case of a library system whose size and arrangement can be varied through freely combining a plurality of consoles, the status monitoring view which closely represents the actual arrangement of the consoles can be easily displayed. The status monitoring view displayed in such a manner enables the user to easily and immediately grasp the composition of the cassette library 1 and the status of each of the parts in the cassette library 1.

Next, description will be given with regard to the function of the library controller 2 to selectively display the status monitoring view in a plurality of display manners whereby the sizes of the display images of the consoles varies, in the embodiment. In the embodiment, the library controller 2 can selectively display the status monitoring view in three manners, namely, in the basic size (L (large) size), in S (small) size and in M (middle) size. In the status monitoring view in the basic size, the size of the display images of the consoles is the largest. In the status monitoring view in S (small) size, the size of the display images of the consoles is the smallest. In the status monitoring view in M (middle) size, the size of the display images of the consoles is intermediate between the basic size and S size.

Figure 13:
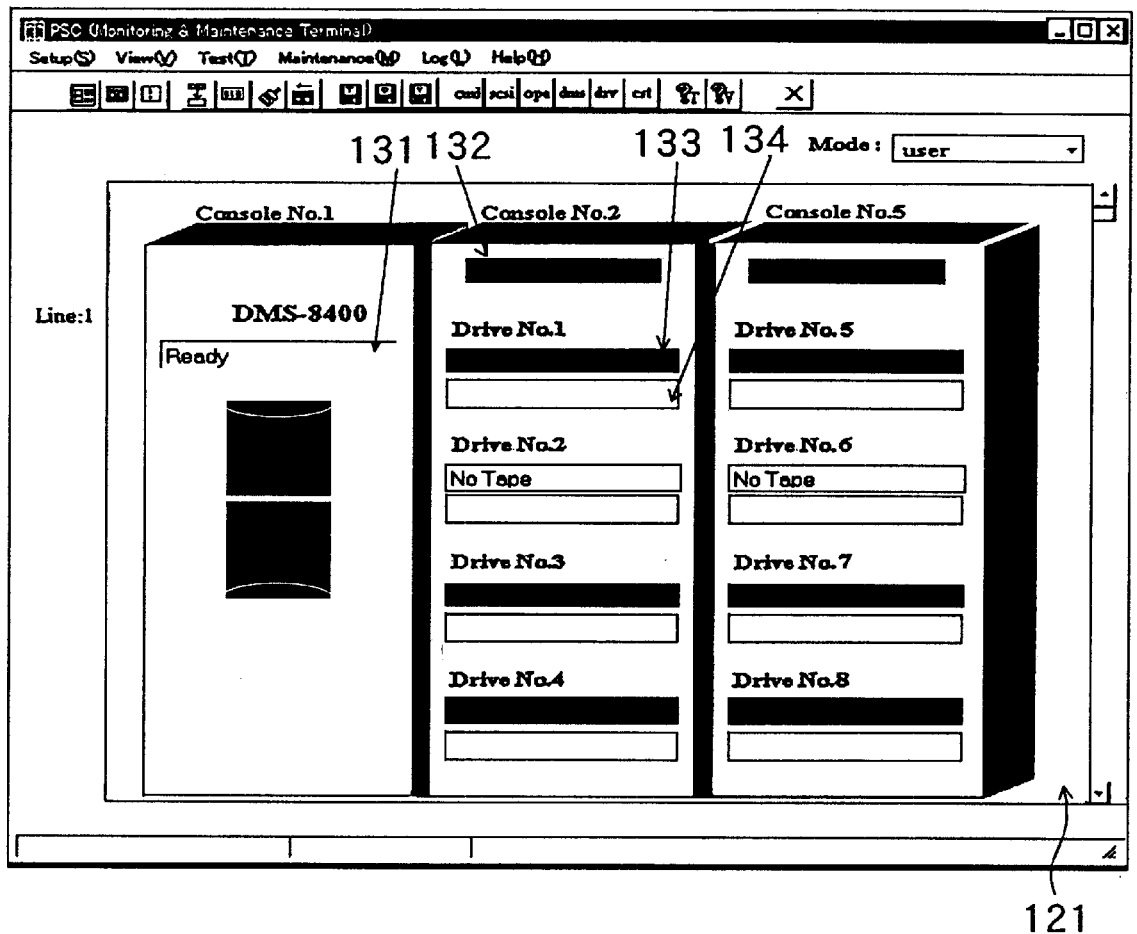
FIG. 13 is an explanatory representation of a status monitoring view in the basic size in the embodiment of the invention.
Figure 14:
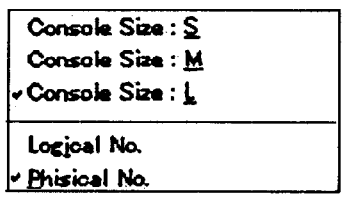
FIG. 14 is an explanatory representation of a size selection menu in the embodiment of the invention.
Figure 15:
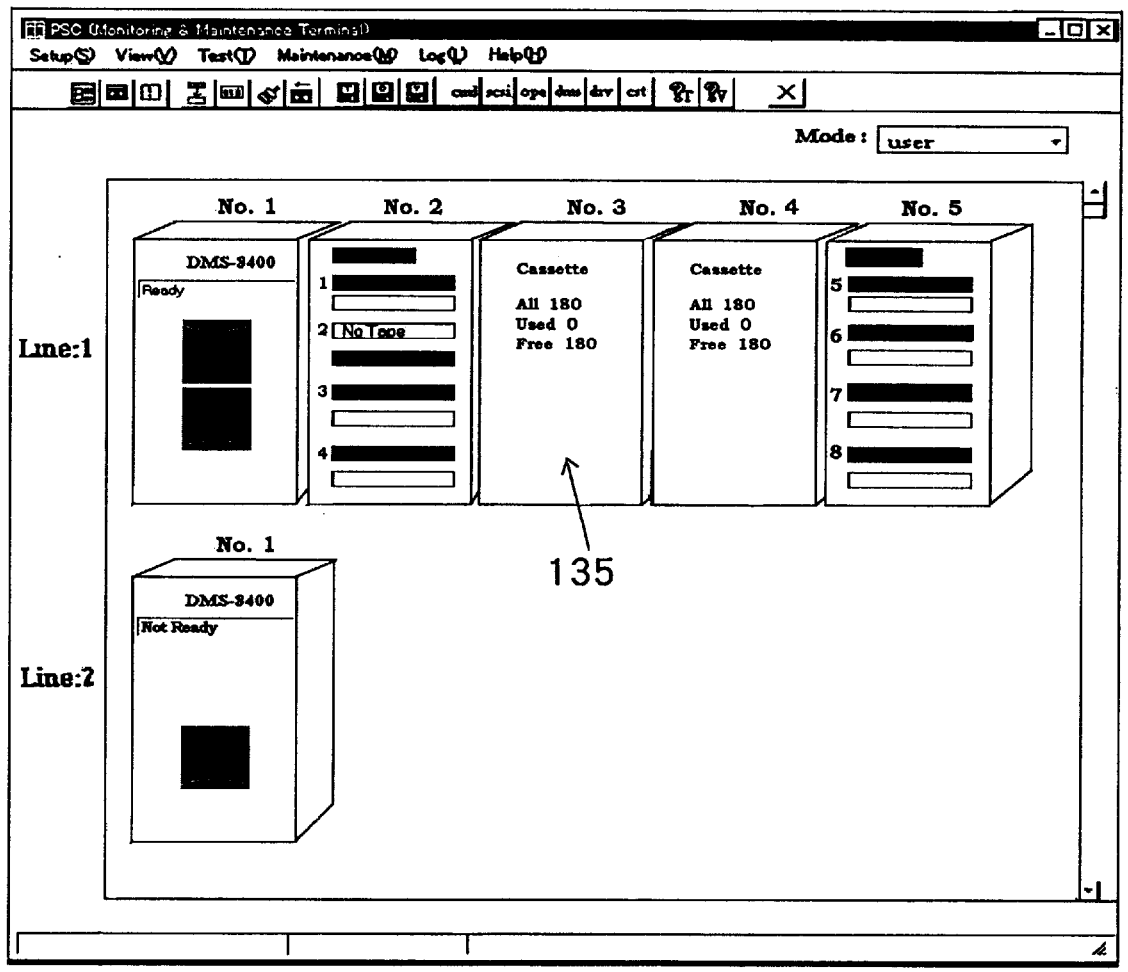
FIG. 15 is an explanatory representation of a status monitoring view in M size in the embodiment of the invention.
Figure 16:
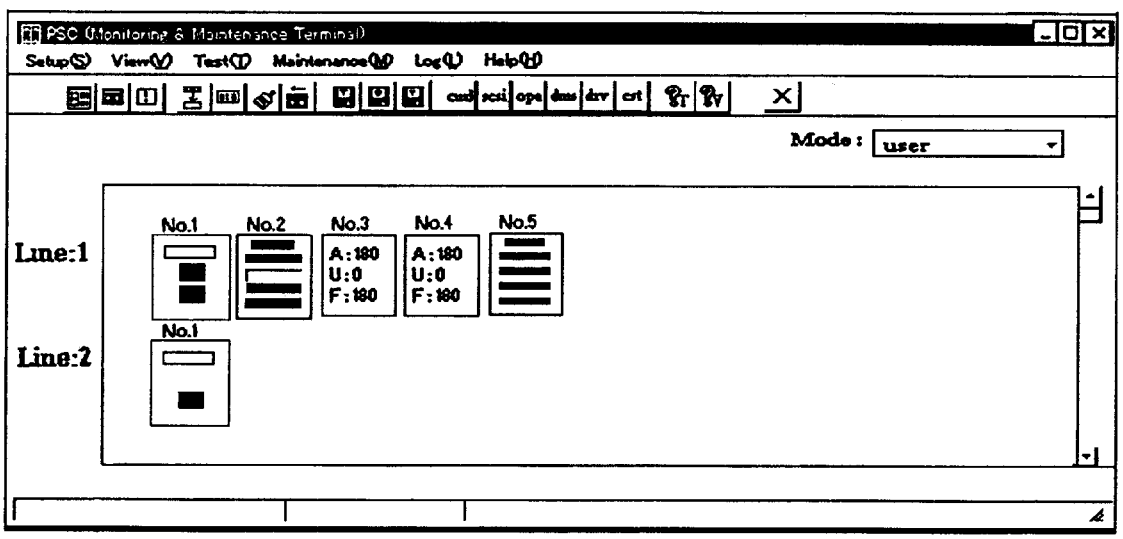
FIG. 16 is an explanatory representation of a status monitoring view in S size in the embodiment of the invention.

In the embodiment, upon activation of the library system, the main view as shown in FIG. 13 is displayed on the display device 23. The main view is the status monitoring view in the basic size. For example, on the status monitoring view in the basic size, when the cursor is put on the margin 121 other than the display images of the consoles and the right mouse button is clicked, a size selection menu as shown in FIG. 14 is displayed. When "Console Size: M" in the size selection menu is selected (the left mouse button is clicked), the status monitoring view in M size as shown in FIG. 15 is displayed. When "Console Size: S" in the size selection menu is selected, the status monitoring view in S size as shown in FIG. 16 is displayed. When "Console Size: L" in the size selection menu is selected, the status monitoring view in the standard size as shown in FIG. 13 is displayed. "Logical No." in the size selection menu shown in FIG. 14 is an option to display the console number displayed with the display image of each console on the status monitoring view by using a logical number. "Phisical No." is an option to display the console number displayed with the display image of each console on the status monitoring view by using a physical number.

When the cursor is put on the margin on the status monitoring view in M size or S size and the right mouse button is clicked, a size/display type selection menu, which is to be described hereinlater, is displayed. The size of the display image of each console can be changed from the size/display type selection menu.

On the status monitoring view in the standard size shown in FIG. 13, the size of the display images of the consoles is large. There may be a case in which some display images of the consoles in the cassette library 1 cannot be displayed. In such a case, only the display images of the basic console and the drive consoles are displayed for the following reason: since the status of the basic console and the status of the drive consoles can be frequently changed, it is important to display the status thereof for monitoring. In contrast, the status of the cassettes in the cassette consoles is not frequently changed, and thus less important for monitoring. In FIG. 13, only the display images of the console line L1 (Line: 1) is shown. However, when the cassette library 1 includes other console lines, the display images of other console lines can be brought into view by scrolling.

On the other hand, on the status monitoring view in M size shown in FIG. 15, the size of the display images of the consoles is relatively small as compared with the case of the standard size. All the display images of the consoles which form the cassette library 1 below a certain size can be displayed on the status monitoring view in M size. When the cassette library 1 is large-scaled, however, it may be difficult to display all the display images of the consoles. In such a case, only the display images of the basic console and the drive consoles may be displayed, as in the case of the standard size. In another alternative, the size of the display image of the consoles may be reduced to the extent sufficient to display all the display images of the consoles.

On the S-sized status monitoring view shown in FIG. 16, the size of the display images of the consoles is the smallest. Even in the case of a large-scaled cassette library, all the display images of the consoles which form the cassette library 1 can be displayed.

In the embodiment, on the status monitoring views in the three sizes, when the status of each of the parts in the cassette library 1 can be displayed in characters such as letters or marks, the status is displayed in characters. When the status cannot be displayed in characters, the status is displayed by using color-coding. In the description given herein, the status is displayed in characters on the standard-sized status monitoring view and the M-sized status monitoring view. On the S-sized status monitoring view, character display of the status may be: (A) possible, (B) impossible, or (C) possible or impossible depending on the status. When character display of the status is possible, the status is displayed in characters. When character display of the status is impossible, the status is displayed by using color-coding.

An example of displaying the status will now be described. As shown in FIG. 13, in a library status box 131 in the display image of the basic console, displayed is the status with the highest priority in the whole cassette library 1 including the cassette carrier 16. When there are a plurality of console lines, displayed is the status with the highest priority in the whole console line L1, for example, the status with the highest priority in the cassette carrier 16. For example, "Ready" indicates that the cassette carrier 16 is in an operable state and "Not Ready" denotes that the cassette carrier 16 is not operable.

In a drive console box 132 in the display image of the drive console, the status with the highest priority in the drive console 1D is displayed. For example, "Fan 1 Stop" indicates that a first fan for cooling in the drive console 1D is stopped.

In a drive status box 133 in the display image of the drive console, the status with the highest priority in the driving apparatus 13 is displayed. For example, "Tape In" represents that the cassette K is in the driving apparatus 13. "No Tape" represents that the cassette K is not in the driving apparatus 13. "Write" represents that the driving apparatus 13 is performing the writing operation. "Read" represents that the driving apparatus 13 is performing the reading operation. "No Use" indicates that the driving apparatus 13 is not in use. "No Communication" denotes that the driving apparatus 13 cannot perform communications or that power is not supplied to the driving apparatus 13.

In a cassette box 134 in the display image of the drive console, ID (identification information) of the cassette K which is in the driving apparatus 13 is displayed.

As shown in FIG. 15, in a display image 135 of the cassette console, prime status of the cassette console is displayed. For example, the total number of housing sections ("All"), the number of housing sections used ("Used"), and the number of free housing sections ("Free") are displayed.

When the status is displayed by using color-coding on the status monitoring view in S size shown in FIG. 16, it is preferable that the status be color-coded in accordance with kind or nature of the status. For example, the status under normal conditions such as "Ready" or "No Tape" is represented in white. The status such as "Not Ready" which requires attention is represented in yellow. The status under abnormal conditions is represented in red. "Write" or "Read" is represented in blue. A request that the user should execute a process is represented in pink.

Figure 17:
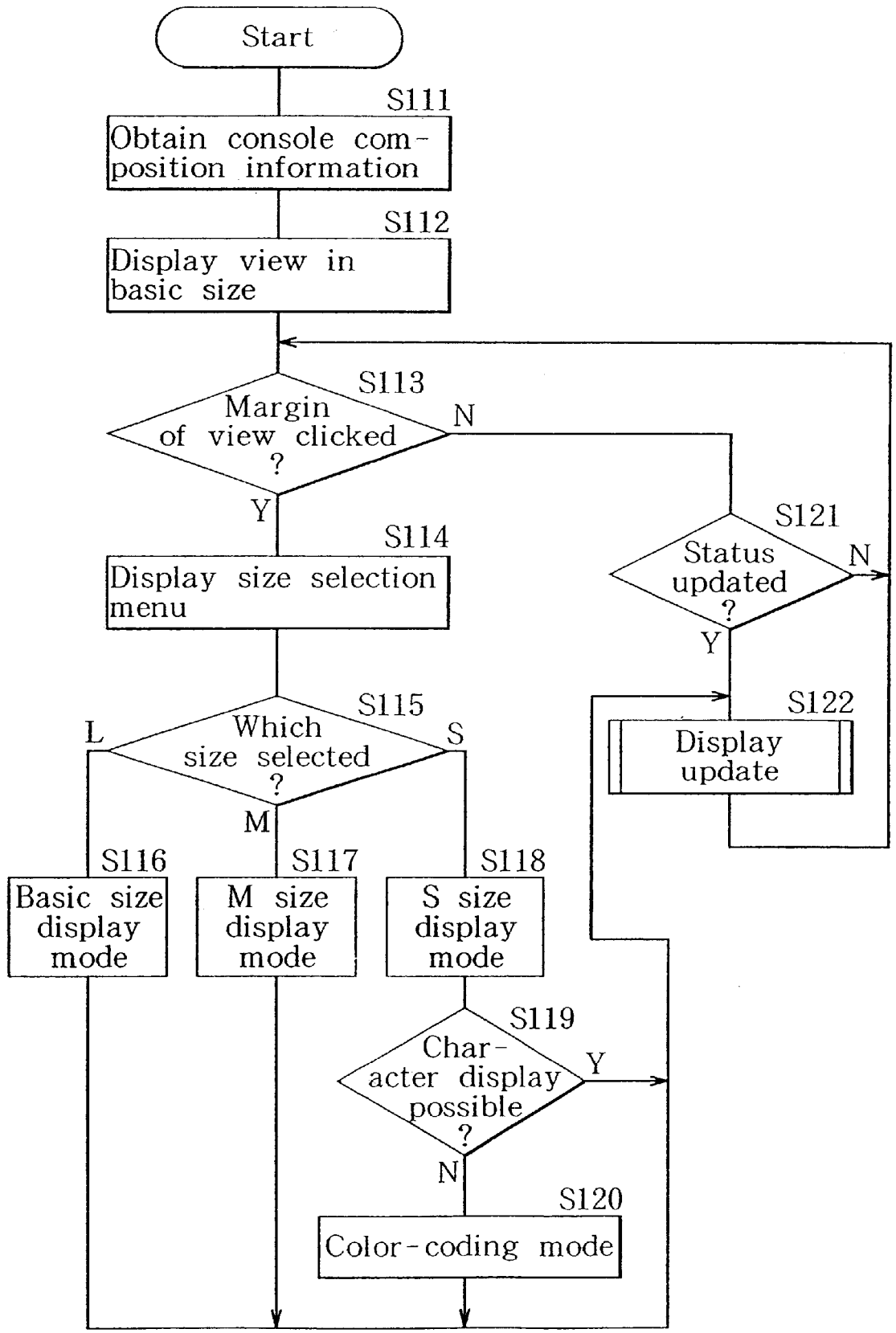
FIG. 17 is a flowchart for switching the size of the status monitoring view in the embodiment of the invention.

Next, the operation for switching the size of the status monitoring view in the library controller 2 will be described by referring to the flowchart of FIG. 17. FIG. 17 shows the operation starting with the activation of the library system. In the operation, the library controller 2 first obtains the console composition information (step S111). The library controller 2 displays the status monitoring view in the basic size on the basis of the obtained console composition information (step S112). The library controller 2 then determines whether the margin 121 of the view is clicked or not (step S113).

If there is a click (Y), the library controller 2 displays the size selection menu shown in FIG. 14 (step S114). The library controller 2 then determines the size selected in the size selection menu (step S115). If "Console Size: L" is selected, the library controller 2 selects the basic size display mode for displaying the status monitoring view in the basic size (step S116). If "Console Size: M" is selected, the library controller 2 selects the M size display mode for displaying, the status monitoring view in M size (step S117). If "Console Size: S" is selected, the library controller 2 selects the S size display mode for displaying the status monitoring view in S size (step S118). Further, the library controller 2 determines whether the status can be displayed in characters or not (step S119). If the status cannot be displayed in characters (N), the color-coding mode for displaying the status by using color-coding is selected (step S120). If the status can be displayed in characters (step S119; Y), the color-coding mode is not selected. When the mode selection is finished as described above, the library controller 2 updates the display of the status monitoring view in accordance with the selected mode (step S122) and the processing routine is returned to step S113.

On the other hand, if the margin 121 in the view is not clicked (step S113; N), the library controller 2 determines whether the status is updated or not (step S121). The library controller 2 monitors the status at any time. If the status is not updated (N), the library controller 2 is returned immediately to step S113. If the status is updated (Y), in order to display the updated status, the library controller 2 updates the display of the status monitoring view (step S122) and the routine is returned to step S113.

As mentioned above, according to the embodiment, the library controller 2 selectively displays the status monitoring view in a plurality of display manners whereby the sizes of the display images of the consoles varies. Thereby, the user can easily grasp and monitor the composition of the cassette library 1 both in whole and in part.

Also, according to the embodiment, the library controller 2 selectively displays at least either the display images of the consoles or information on status in a plurality of display manners on the status monitoring view. The user therefore can select a display manner of the status monitoring view in accordance with the purpose.

Especially, according to the embodiment, when the status cannot be displayed in characters, the status is displayed by using color-coding. The user can therefore easily grasp the status in outline and determine promptly and easily whether or not there is anything wrong. Especially, under normal conditions, the detailed information of the status is not necessary and it is sufficient to determine whether there is anything wrong or not. Thus, displaying the status by using color-coding enables efficient monitoring of the whole cassette library 1.

In the embodiment, also in the case where the status can be displayed in characters, the color of the background of the characters may be changed according to the status.

The description will now be given with regard to the function of the library controller 2 to output detailed information on the status related to a designated position in response to a designation of a predetermined position in the status monitoring view.

Although the operation in the S-sized status monitoring view shown in FIG. 18 will be described hereinbelow as an example, the operations in the basic-sized and M-sized status monitoring views are similarly executed.

Figure 18:
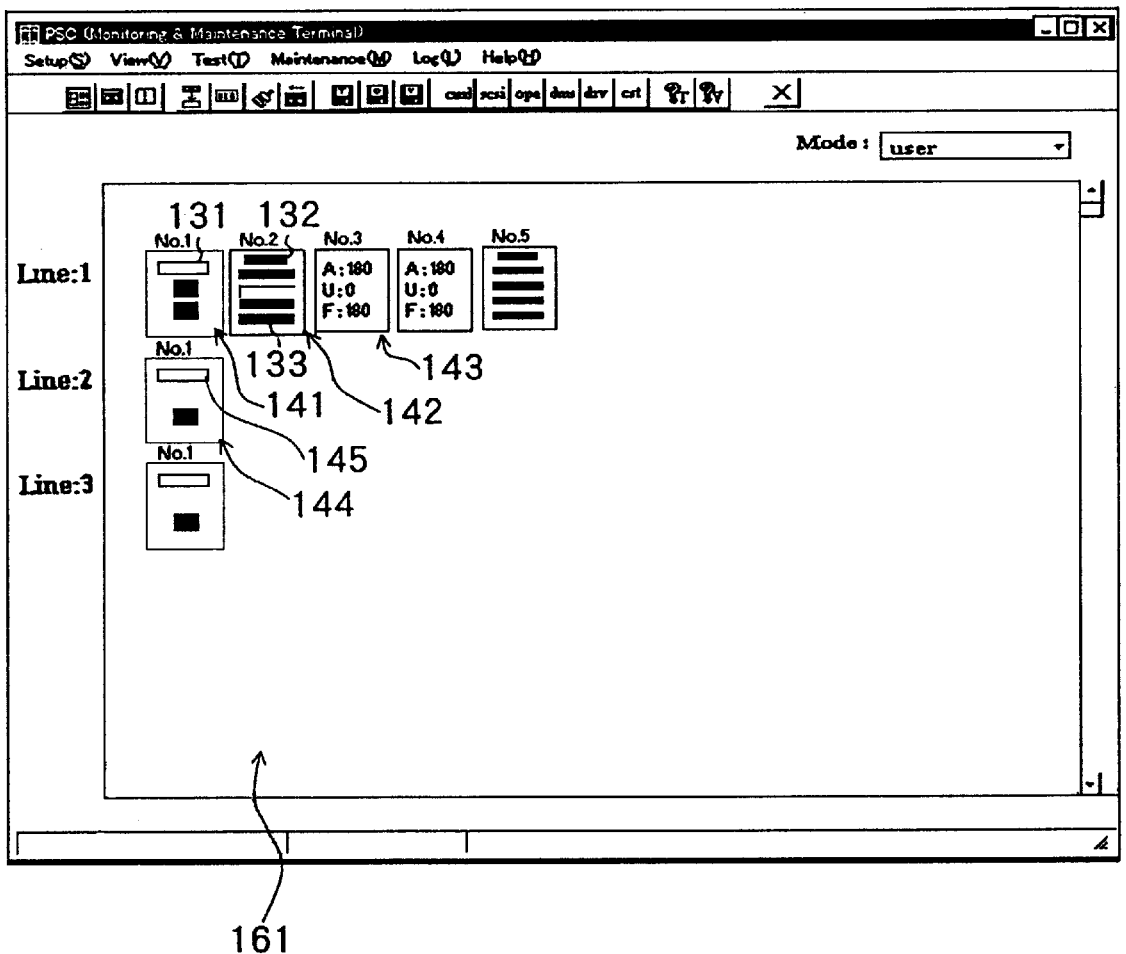
FIG. 18 is an explanatory representation for explaining the operation for outputting detailed information on status in the embodiment of the invention.
Figure 19:
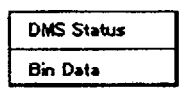
FIG. 19 is an explanatory representation of a detailed display selection menu of the basic console in the embodiment of the invention.
Figure 20:
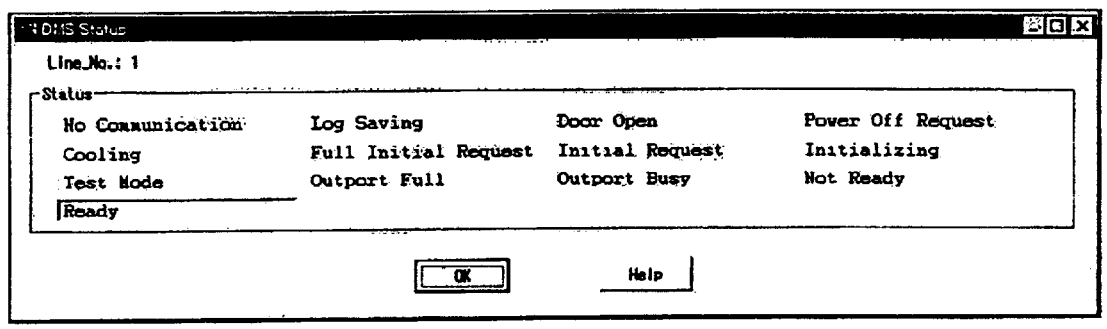
FIG. 20 is an explanatory representation of an image of the detailed status of the cassette library in the embodiment of the invention.

In the embodiment, when the right mouse button is clicked on a display image 141 of the basic console on the status monitoring view as shown in FIG. 18, a detailed display selection menu shown in FIG. 19 is displayed. When "library status" ("DMS Status" in FIG. 19) in the detailed display selection menu is selected (the left mouse button is clicked), as shown in FIG. 20, the detailed status of the cassette library 1, for example, the detailed status of the cassette carrier 16 is displayed (when there are a plurality of console lines, the detailed status of the cassette carrier 16 in the console line L1 is displayed). When the left mouse button is double-clicked on the library status box 131 in the display image 141 of the basic console, the detailed status of the cassette library 1 as shown in FIG. 20 is also displayed.

Figure 21:
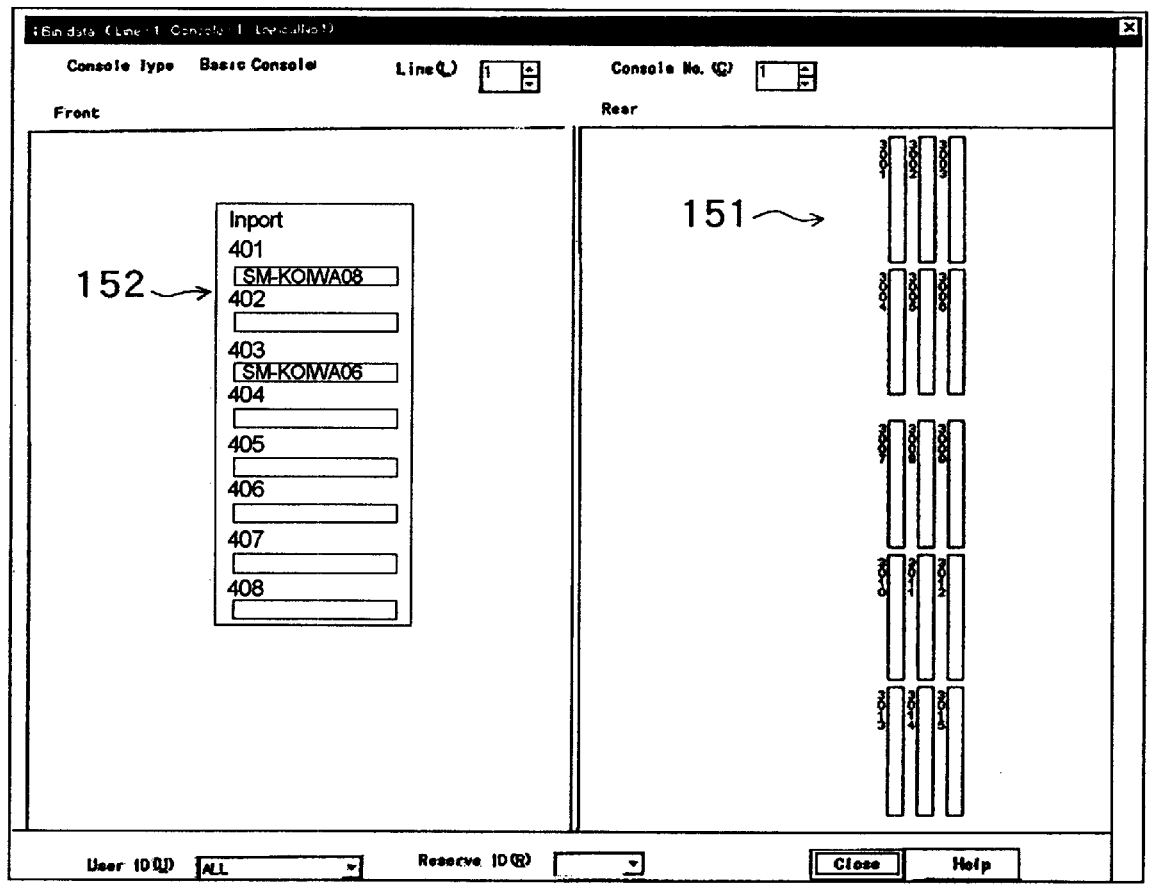
FIG. 21 is an explanatory representation of an image of bin status of the basic console in the embodiment of the invention.

When "Bin Data" in the detailed display selection menu shown in FIG. 19 is selected, as shown in FIG. 21, detailed information (hereinbelow, referred to as bin status) of the cassettes in the basic console 1B is displayed. On the display of the bin status, an area 151 corresponding to each of the housing sections is provided. When the cassette K is housed in a housing section, the ID of the cassette is displayed in the corresponding area 151. On the display of the bin status shown in FIG. 21, an area 152 corresponding to the input/output port 11 is also provided. When the cassette K is in the input/output port 11, the ID of the cassette is displayed in the area 152. When the left mouse button is double-clicked on the margin of the display image 141 of the basic console, the bin status shown in FIG. 21 is displayed.

Figure 22:
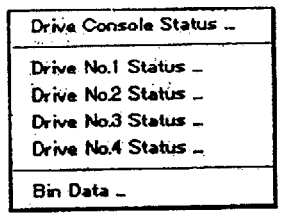
FIG. 22 is an explanatory representation of a detailed display selection menu of a drive console in the embodiment of the invention.
Figure 23:
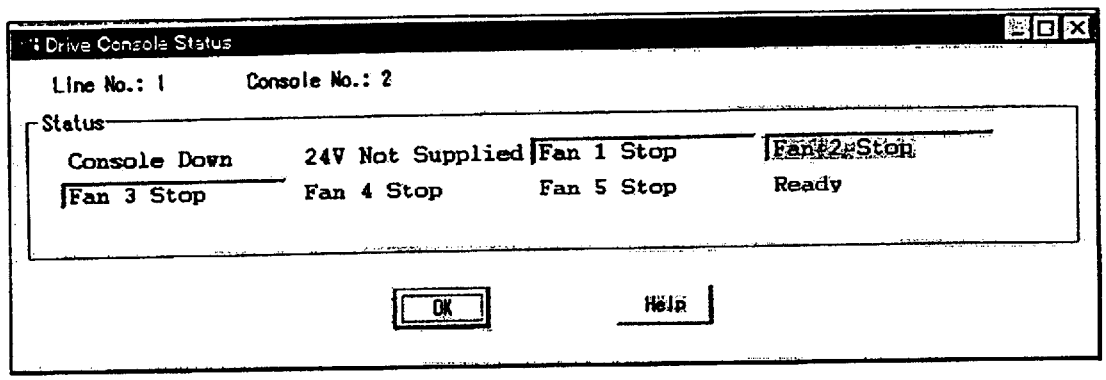
FIG. 23 is an explanatory representation of an image of detailed status of the drive console in the embodiment of the invention.

When the right mouse button is clicked on a display image 142 of the drive console on the status monitoring view as shown in FIG. 18, a detailed display selection menu shown in FIG. 22 is displayed. When "Drive Console Status" in the detailed display selection menu shown in FIG. 22 is selected, the detailed status of the drive console 1D as shown in FIG. 23 is displayed. When the left mouse button is double-clicked on the drive status box 132 in the display image 142 of the drive console, the detailed status of the drive console 1D as shown in FIG. 23 is displayed.

Figure 24:
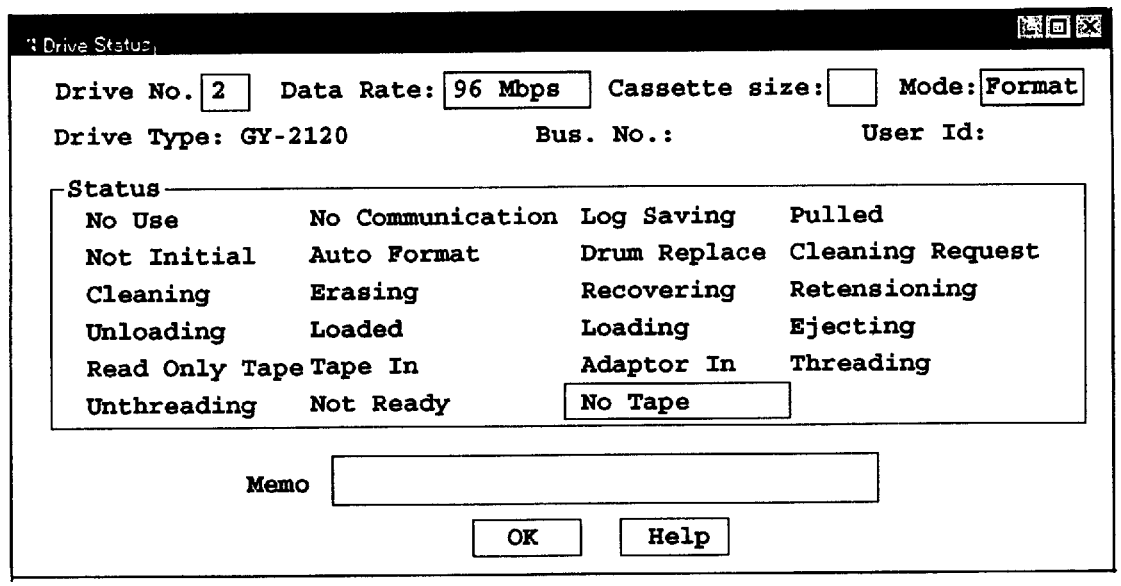
FIG. 24 is an explanatory representation of an image of detailed status of a driving apparatus in the embodiment of the invention.

When any of a plurality of drive status, namely, "Drive No. 1 Status" to "Drive No. 4 Status", in the detailed display selection menu shown in FIG. 22 is selected, as shown in FIG. 24, the detailed status of the corresponding driving apparatus 13 is displayed. Also in the case of double-clicking the left mouse button on the drive status box 133 in the display image 142 of the drive console, the detailed status of the driving apparatus 13 as shown in FIG. 24 is displayed.

Figure 25:
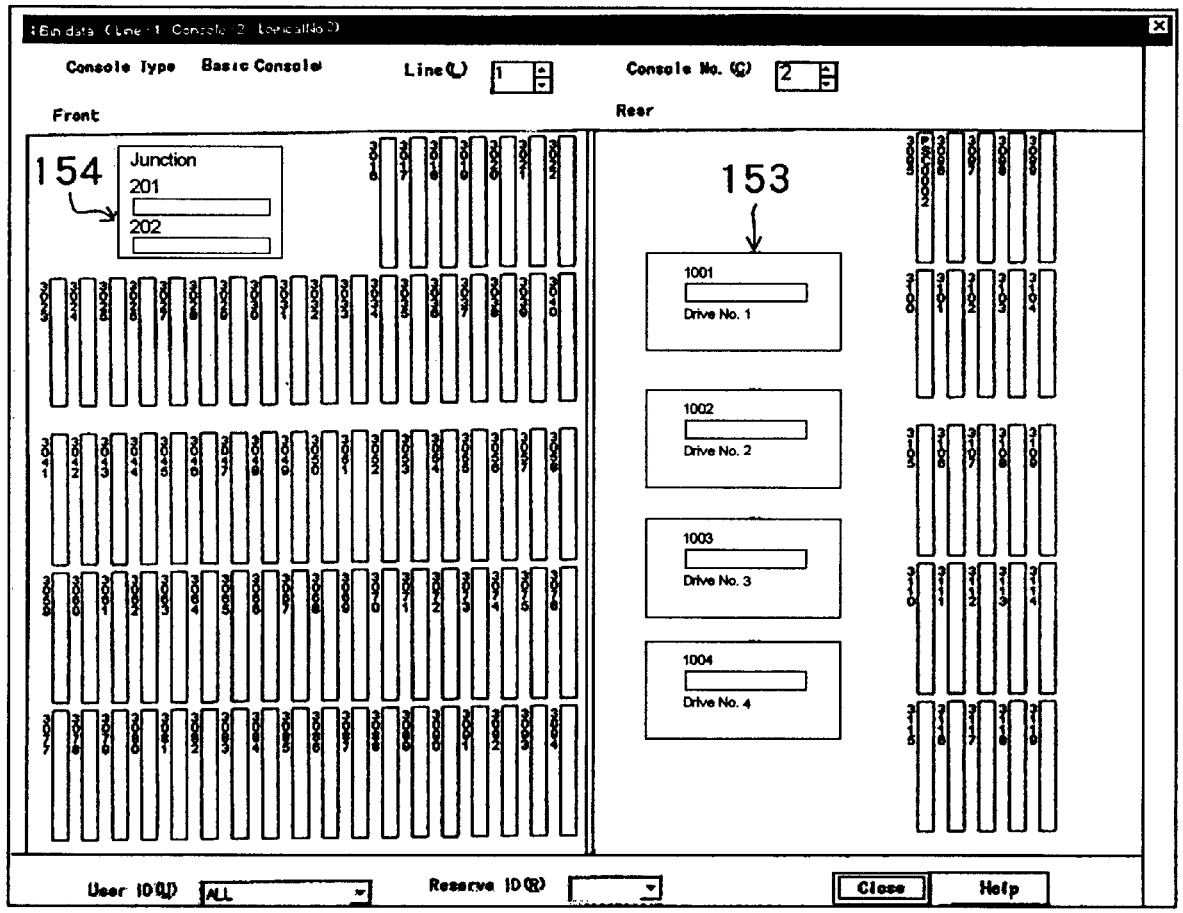
FIG. 25 is an explanatory representation of an image of bin status of the drive console in the embodiment of the invention.

When "Bin Data" in the detailed display selection menu shown in FIG. 22 is selected, as shown in FIG. 25, the bin status in the drive console 1D is displayed. On the bin status display shown in FIG. 25, an area 153 corresponding to the driving apparatuses 13 and an area 154 corresponding to a port to transfer the cassette K to/from the junction port 18 in the junction console 1J are also provided. When the cassette K is in the driving apparatuses 13 or in the port, the ID of the cassette is displayed in the corresponding area 153 or 154. In the case of double-clicking the left mouse button on the margin of the display image 142 of the drive console as well, the bin status shown in FIG. 25 is displayed.

Figures 26, 27:
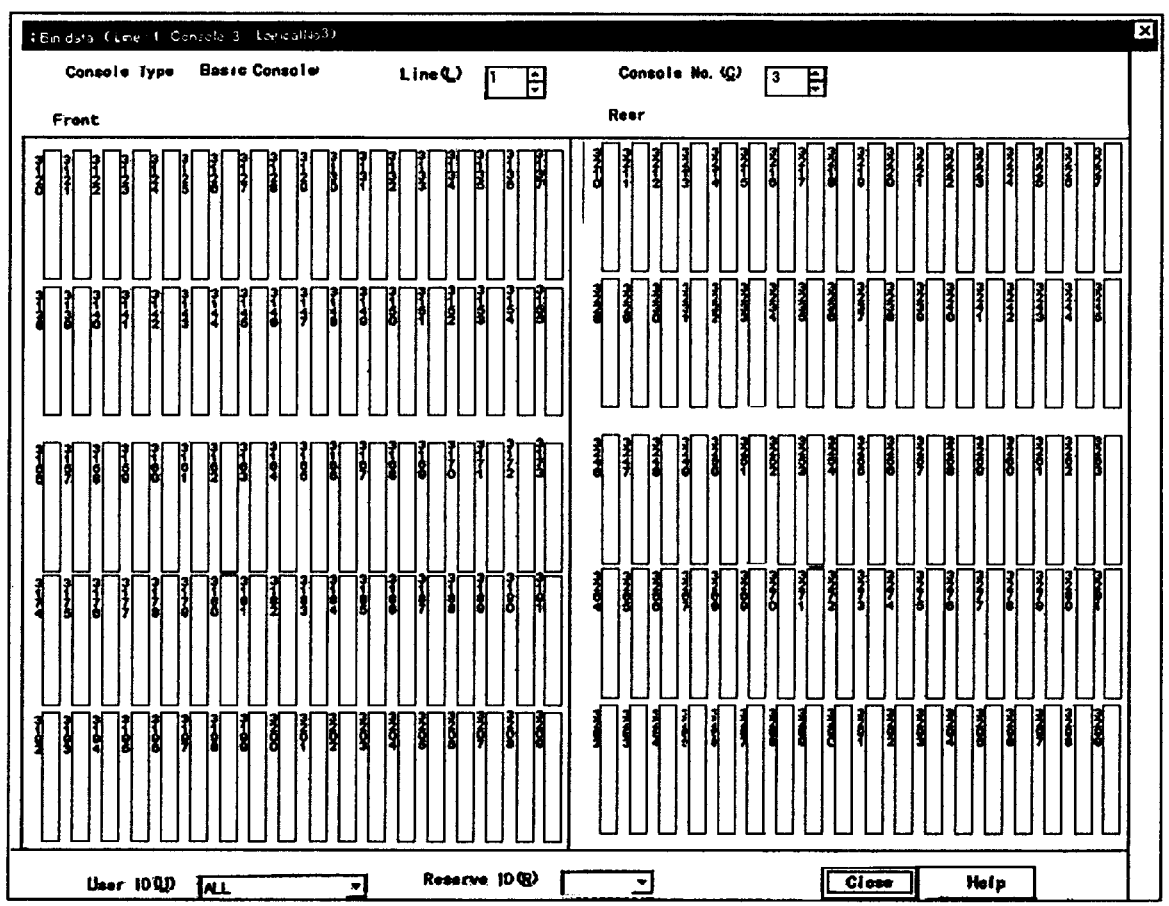
FIG. 26 is an explanatory representation of a detailed display selection menu of a cassette console in the embodiment of the invention.
FIG. 27 is an explanatory representation of an image of bin status of the cassette console in the embodiment of the invention.

When the right mouse button is clicked on the display image 143 of the cassette console on the status monitoring view as shown in FIG. 18, a detailed display selection menu shown in FIG. 26 is displayed. When "Bin Data" in the detailed display selection menu shown in FIG. 26 is selected, as shown in FIG. 27, the bin status in the cassette console 1C is displayed. In the case of left-double click on the display image 143 of the cassette console, the bin status shown in FIG. 27 is displayed.

Figure 28:
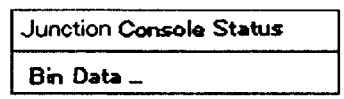
FIG. 28 is an explanatory representation of a detailed display selection menu of a junction console in the embodiment of the invention.

When the right mouse button is clicked on the display image 144 of the junction console on the status monitoring view as shown in FIG. 18, a detailed display selection menu shown in FIG. 28 is displayed. When "Junction Console Status" in the detailed display selection menu shown in FIG. 28 is selected, although not shown, the detailed status of the junction console 1J is displayed. The status is, for example, the detailed status of the cassette carrier 16 in the console line corresponding to the junction console 1J, as in the case of FIG. 20. In the case of the left-double click on the junction console status box 145 in the display image 144 of the junction console, the detailed status of the junction console 1J is displayed.

Figure 29:
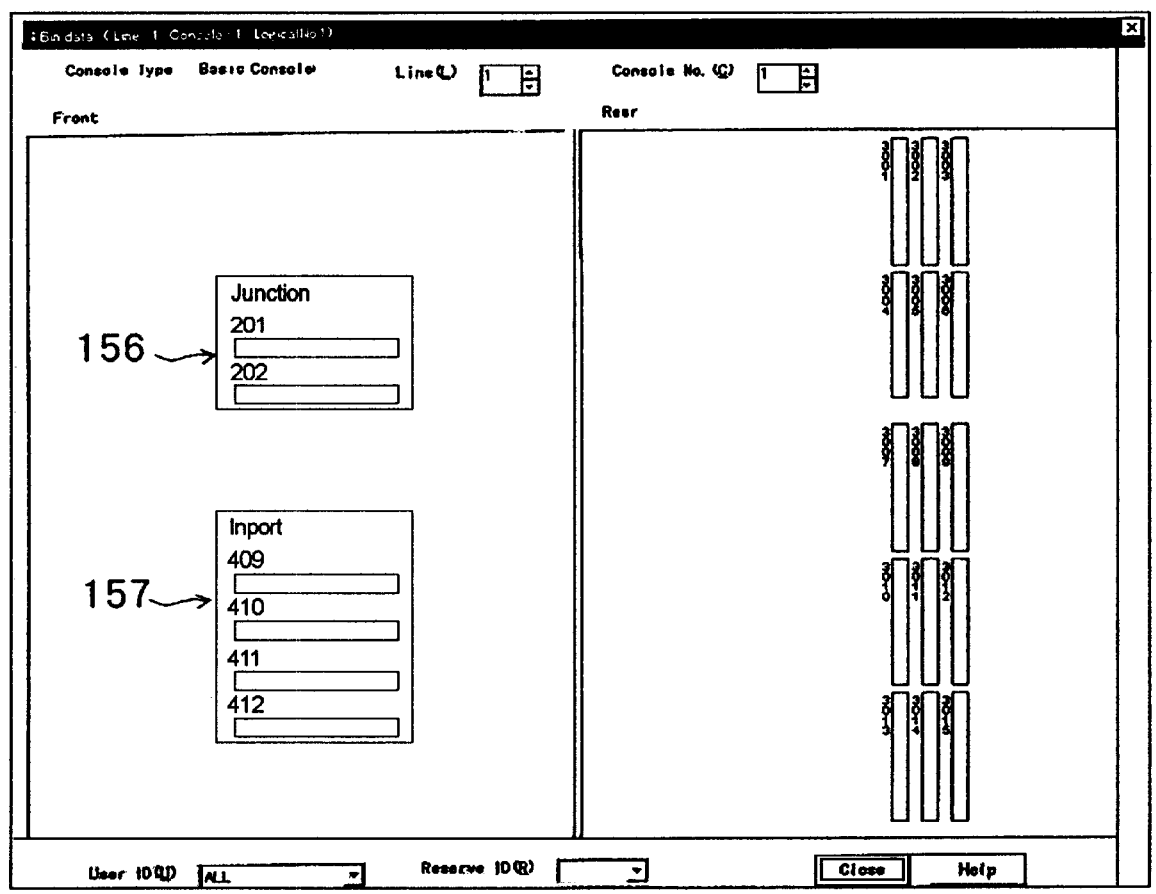
FIG. 29 is an explanatory representation of an image of bin status of the junction console in the embodiment of the invention.
Figure 30:
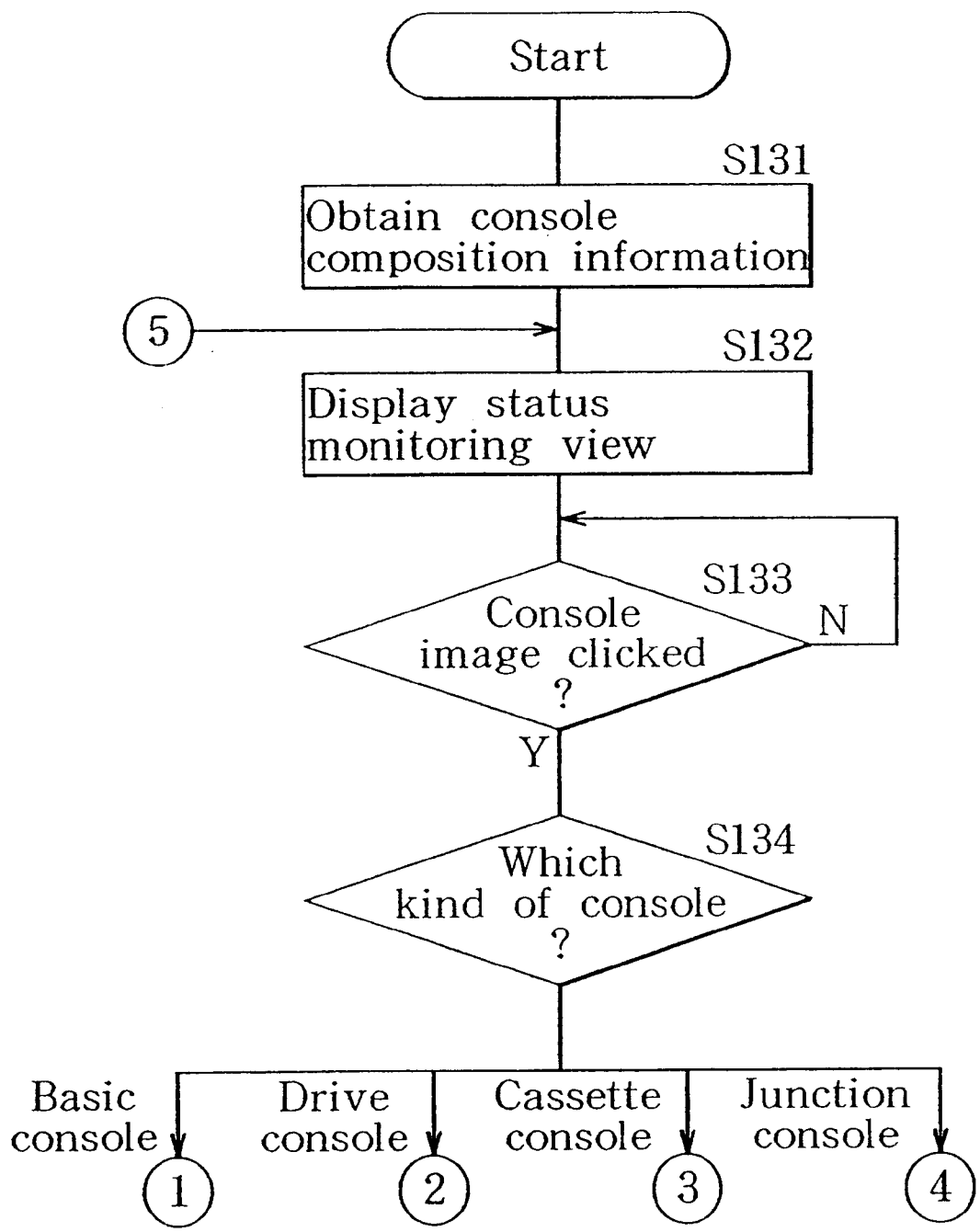
FIG. 30 is a flowchart for outputting detailed information on status in the embodiment of the invention.

When "Bin Data" in the detailed display selection menu shown in FIG. 28 is selected, as shown in FIG. 29, the bin status in the junction console 1J is displayed. On the display of the bin status, an area 156 corresponding to the junction port 18 in the junction console 1J and an area 157 corresponding to the input/output port are provided. When the cassettes K are in the ports, the IDs of the cassettes are displayed in the corresponding areas 156 and 157. In the case of the left-double click on the margin of the display image 144 in the junction console as well, the bin status shown in FIG. 29 is displayed.

The operation for outputting the detailed information of the status in the library controller 2 will now be described by referring to the flowcharts shown in FIGS. 30 to 34. FIGS. 30 to 34 show the operation starting with the activation of the library system. In the operation, first, the library controller 2 obtains the console composition information (step S131). The library controller 2 then displays the status monitoring view on the basis of the obtained console composition information (step S132). Then the library controller 2 determines whether the console image in the status monitoring view is clicked or not (step S133). If the console image is not clicked (N), step S133 is repeated and the status monitoring view remains displayed.

If the console image in the status monitoring view is clicked (step S133; Y), the library controller 2 determines the kind of the clicked console (step S134). When the clicked console is the basic console, the routine advances to the operation shown in FIG. 31. When the clicked console is the drive console, the routine advances to the operation shown in FIG. 32. If the clicked console is the cassette console, the routine advances to the operation shown in FIG. 33. If the clicked console is the junction console, the routine advances to the operation shown in FIG. 34.

Figure 31:
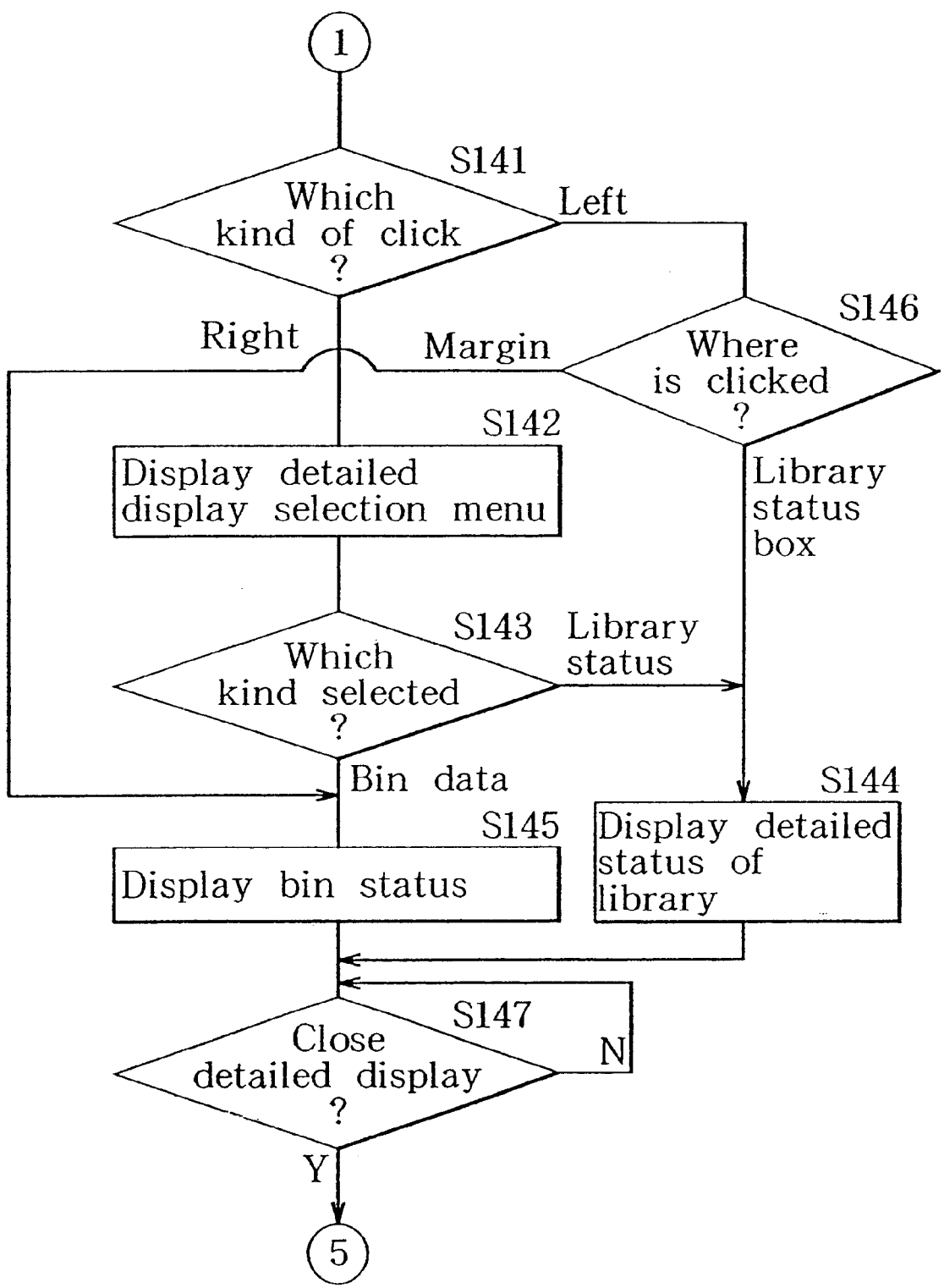
FIG. 31 is a flowchart continued from FIG. 30.

As shown in FIG. 31, if the basic console image is clicked, the library controller 2 first determines the kind of the click (step S141). If the kind of the click is the right-click, the library controller 2 displays the detailed display selection menu shown in FIG. 19 (step S142) and determines the kind selected in the detailed display selection menu (step S143). If the kind selected is the library status, the library controller 2 displays the detailed status of the library shown in FIG. 20 (step S144). If the kind selected is the bin data, the bin status shown in FIG. 21 is displayed (step S145). On the other hand, if the kind of the click is the left double click, the library controller 2 determines the position of the click (step S146). If the position of the click is in the library status box, the detailed status of the library shown in FIG. 20 is displayed (step S144). If the position of the click is in the margin, the bin status shown in FIG. 21 is displayed (step S145). After the library controller 2 produces the detailed display such as the detailed status of the library or bin status, the library controller 2 determines whether the operation of closing the detailed display has been performed or not (step S147). If the operation has not been executed (N), step S147 is repeated. If the operation has been executed (Y), the routine is returned to step S132 shown in FIG. 30 and the status monitoring view is displayed. The operation of closing the detailed display is performed by, for example, selection of a button labeled as "OK" in the detailed display selection menu.

Figure 32:
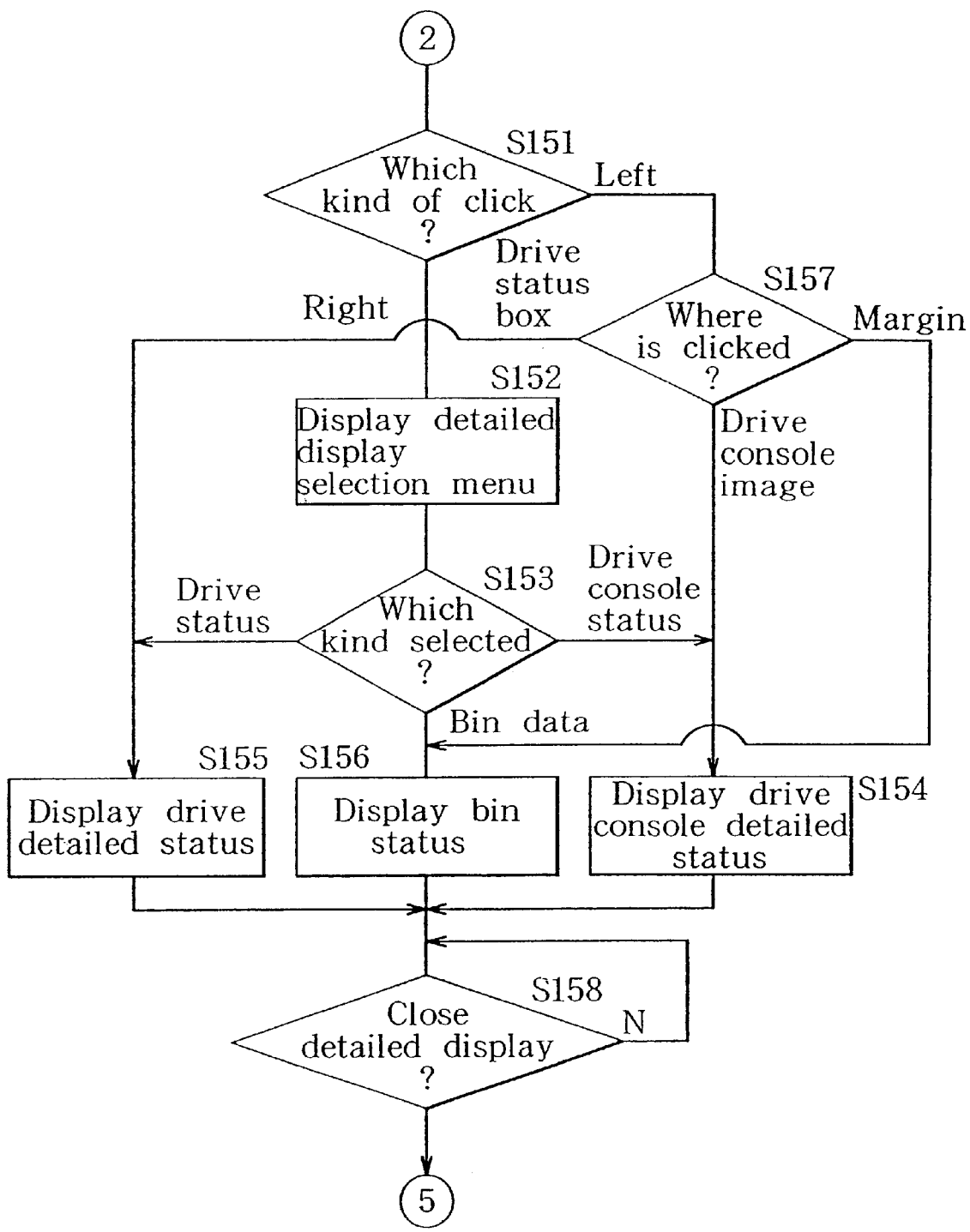
FIG. 32 is a flowchart continued from FIG. 30.

As shown in FIG. 32, if the drive console image is clicked, the library controller 2 first determines the kind of the click (step S151). If the kind of the click is the right click, the library controller 2 displays the detailed display selection menu shown in FIG. 22 (step S152) and determines the kind selected in the detailed display selection menu (step S153). If the kind selected is the drive console status, the library controller 2 displays the detailed status of the drive console shown in FIG. 23 (step S154). If the kind selected is the drive status, the detailed status of the driving apparatus 13 shown in FIG. 24 is displayed (step S155). If the kind selected is the bin data, the bin status shown in FIG. 25 is displayed (step S156). On the other hand, if the kind of the click is the left double click, the library controller 2 determines the position of the click (step S157). If the position of the click is in the display image of the drive console, the detailed status of the drive console shown in FIG. 23 is displayed (step S154). If the position of the click is in the drive status box, the detailed status of the driving apparatus 13 shown in FIG. 24 is displayed (step S155). If the position of the click is in the margin, the bin status shown in FIG. 25 is displayed (step S156). After the library controller 2 produces the detailed displays, the library controller 2 determines whether the operation of closing the detailed display has been performed or not (step S158). If the operation has not been executed (N), step S158 is repeated. If the operation has been executed (Y), the routine is returned to step S132 shown in FIG. 30, where the status monitoring view is displayed.

Figure 33:
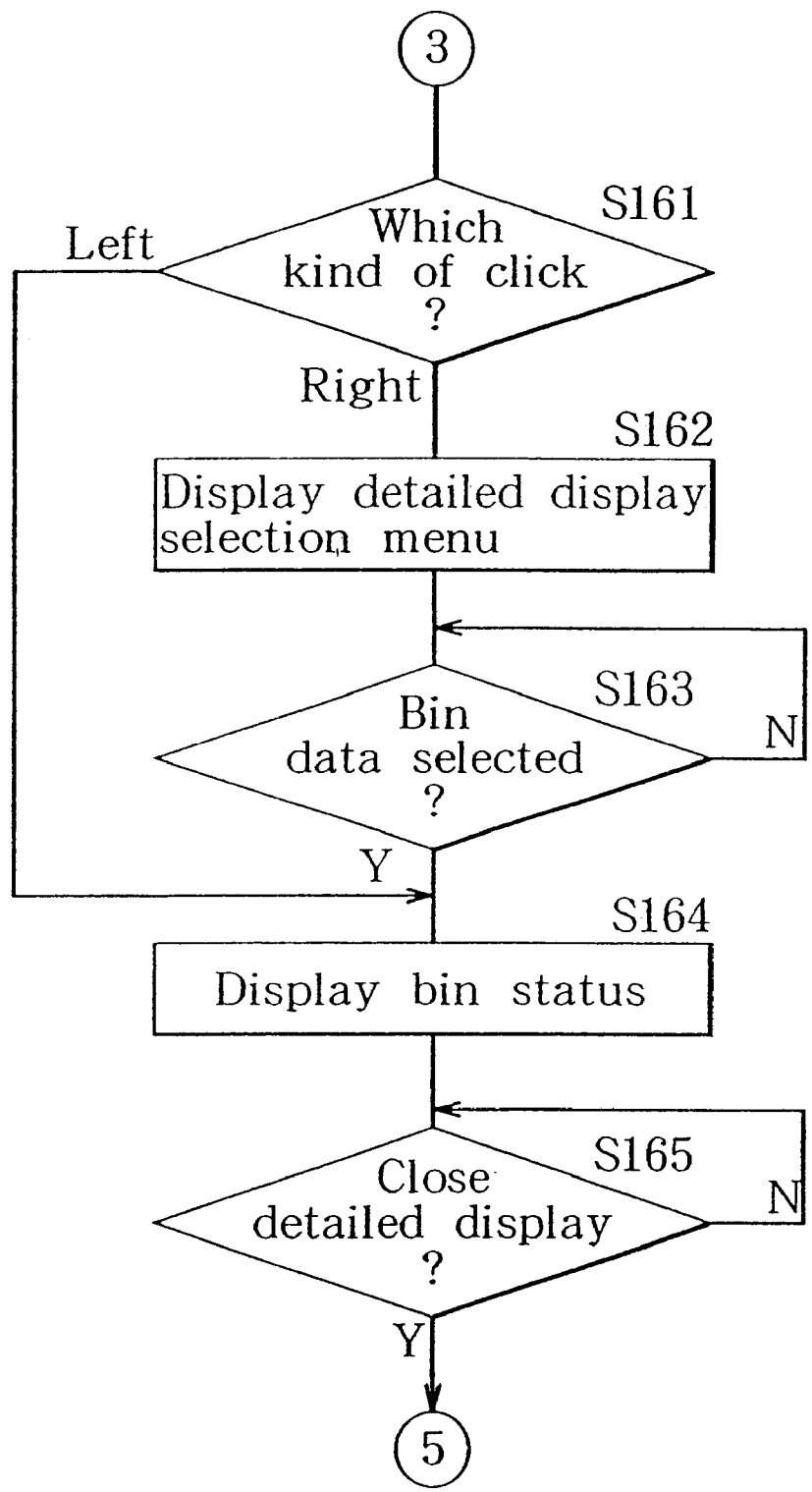
FIG. 33 is a flowchart continued from FIG. 30.

As shown in FIG. 33, if the cassette console image is clicked, the library controller 2 first determines the kind of the click (step S161). If the kind of click is the right click, the library controller 2 displays the detailed display selection menu shown in FIG. 26 (step S162) and determines whether the bin data is selected in the detailed display selection menu or not (step S163). If the bin data is not selected (N), step S163 is repeated. If the bin data is selected (Y), the bin status shown in FIG. 27 is displayed (step S164). On the other hand, if the kind of the click is the left double click, the library controller 2 displays the bin status shown in FIG. 27 (step S164). After the bin status is displayed, the library controller 2 determines whether the operation of closing the detailed display has been performed or not (step S165). If the operation has not been executed (N), step S165 is repeated. If the operation has been executed (Y), the routine is returned to step S132 shown in FIG. 30 and the status monitoring view is displayed.

Figure 34:
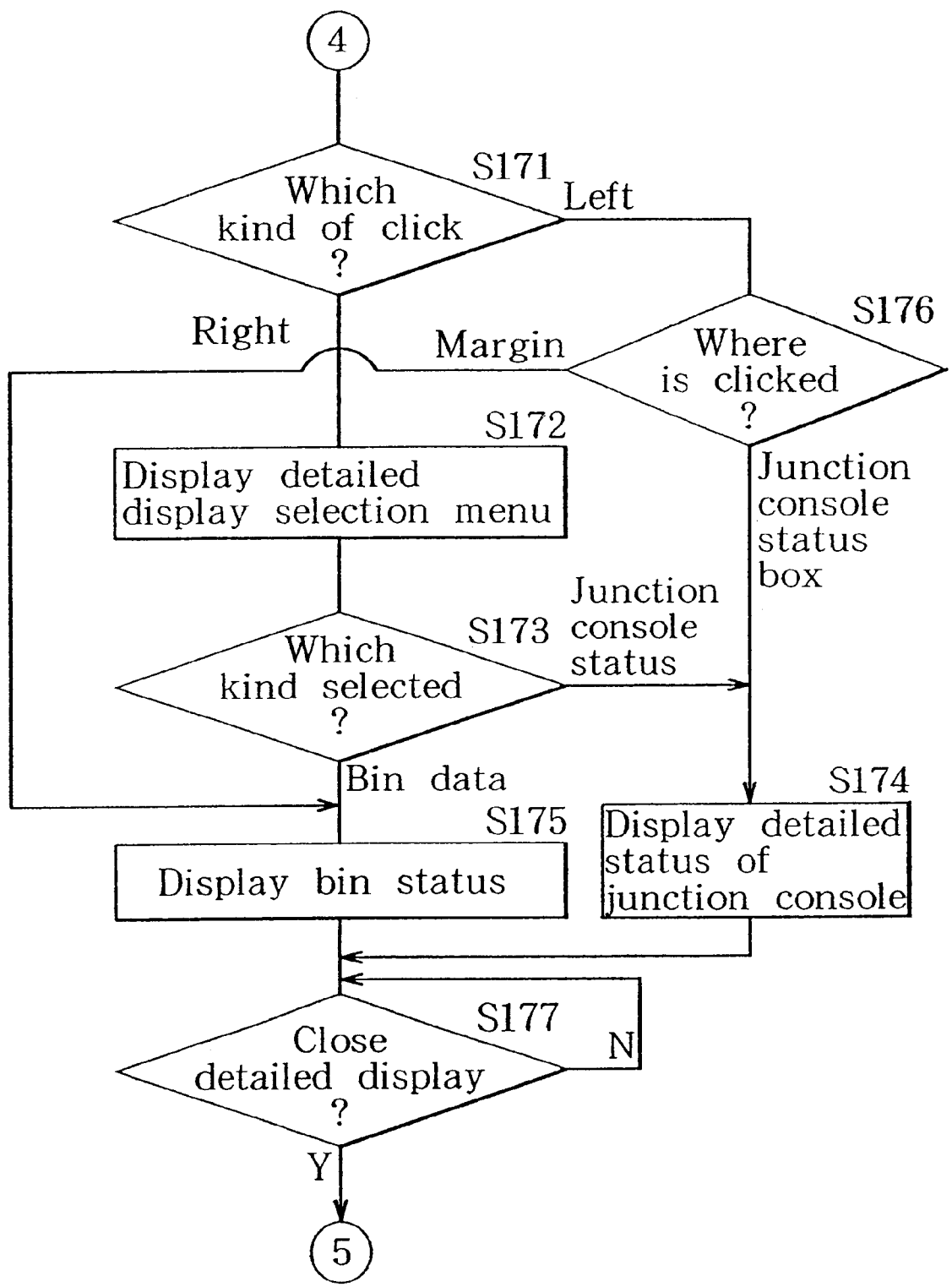
FIG. 34 is a flowchart continued from FIG. 30.

As shown in FIG. 34, if the junction console image is clicked, the library controller 2 first determines the kind of the click (step S171). If the kind of the click is the right click, the library controller 2 displays the detailed display selection menu shown in FIG. 28 (step S172) and determines the kind selected in the detailed display selection menu (step S173). If the selected kind is the junction console status, the library controller 2 displays a junction console detailed status, although not shown (step S174). If the selected kind is the bin data, the library controller 2 displays the bin status shown in FIG. 29 (step S175). On the other hand, if the kind of the click is the left double click, the library controller 2 determines the position of the click (step S176). If the position of the click is in the junction console status box, the junction console detailed status, although not shown, is displayed (step S174). If the position of the click is in the margin, the bin status shown in FIG. 29 is displayed (step S175). After displaying the detailed display, the library controller 2 determines whether the operation of closing the detailed display has been performed or not (step S177). If the operation has not been performed (N), step S177 is repeated. If the operation has been performed (Y), the routine is returned to step S132 shown in FIG. 30 and the status monitoring view is displayed.

Since it is difficult to display the detailed status information in the status monitoring view, it has been conventional practice to perform complicated operations in order to display the detailed status information. Specifically, another menu for displaying the detailed status information is opened and then an option whose detailed status information is desired to be displayed is selected.

In contrast, in the embodiment, in response to the designation (click) of a predetermined position in the display image in each console on the status monitoring view, the detailed status information related to the designated position is displayed. Consequently, the detailed information on the part desired by the user can be displayed by a simple operation while the status of the whole system is displayed. The user can promptly and easily monitor both the whole cassette library 1 in outline with the status monitoring view and part of the cassette library 1 in detail with the detailed display. Thereby, prompt action can be taken especially upon occurrence of an error.

Description will now be made in detail of the function of the library controller 2 to selectively display the status monitoring view in a plurality of display manners including display manners whereby a logical composition of the devices is displayed and display manners whereby a physical composition of the devices is displayed, in the embodiment.

As already described, on the status monitoring view in the basic size as shown in FIG. 13, when the margin 121 other than the display images of the console is right clicked, the size selection menu as shown in FIG. 14 is displayed. On the other hand, on the status monitoring view in M size as shown in FIG. 15 or the status monitoring view in S size as shown in FIG. 16, when the margin other than the display images of the consoles is right clicked, a size/display type selection menu as shown in FIG. 35 is displayed.

Figure 35:
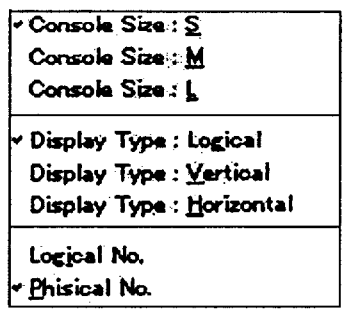
FIG. 35 is an explanatory representation of a size/display type selection menu in the embodiment of the invention.

The size/display type selection menu shown in FIG. 35 includes not only the options included in the size selection menu shown in FIG. 14 but also three options for selecting the display type, namely, "Display Type: Logical", "Display Type: Vertical" and "Display Type: Horizontal". "Display Type: Logical" is an option for selecting the display of the logical composition of the consoles (hereinbelow, also referred to as logical display). "Display Type: Vertical" is an option for selecting the display of the physical composition of the consoles (hereinbelow, also referred to as portrait orientation) so that the console line L1 as a base is disposed in the vertical direction of the view. "Display Type: Horizontal" is an option for selecting the display of a physical composition of the consoles so that the console line L1 as a base is disposed in the lateral direction of the view (hereinbelow, also referred to as landscape orientation).

For example, when "Display Type: Logical" in the size/display type selection menu shown in FIG. 35 is selected (the left mouse button is clicked) on the status monitoring view in S size, the status monitoring view in the logical display, for example, as shown in FIG. 18 is displayed. On the status monitoring view in the logical display, consoles are sorted according to console lines and the logical composition of the consoles is displayed so that the logical numbers of the consoles included in each console line can be disclosed.

Figure 36:
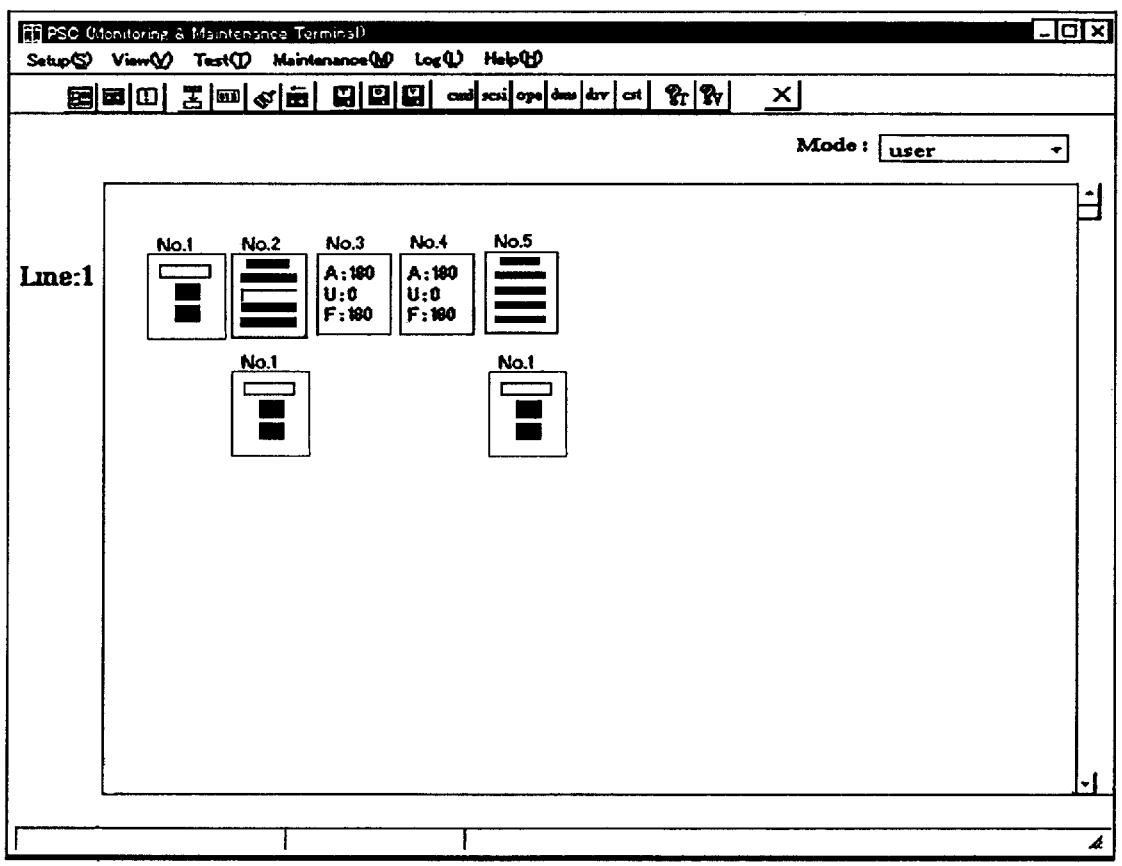
FIG. 36 is an explanatory representation of a status monitoring view in landscape in the embodiment of the invention.

For example, when "Display Type: Horizontal" in the size/display type selection menu shown in FIG. 35 is selected on the status monitoring view in S size, the status monitoring view in landscape as shown in FIG. 36 is displayed. On the status monitoring view in landscape, a physical composition of the consoles is displayed so that the console line L1 as a base is disposed in the lateral direction of the view. On the status monitoring view in landscape, the connection among the consoles is also disclosed.

Figure 37:
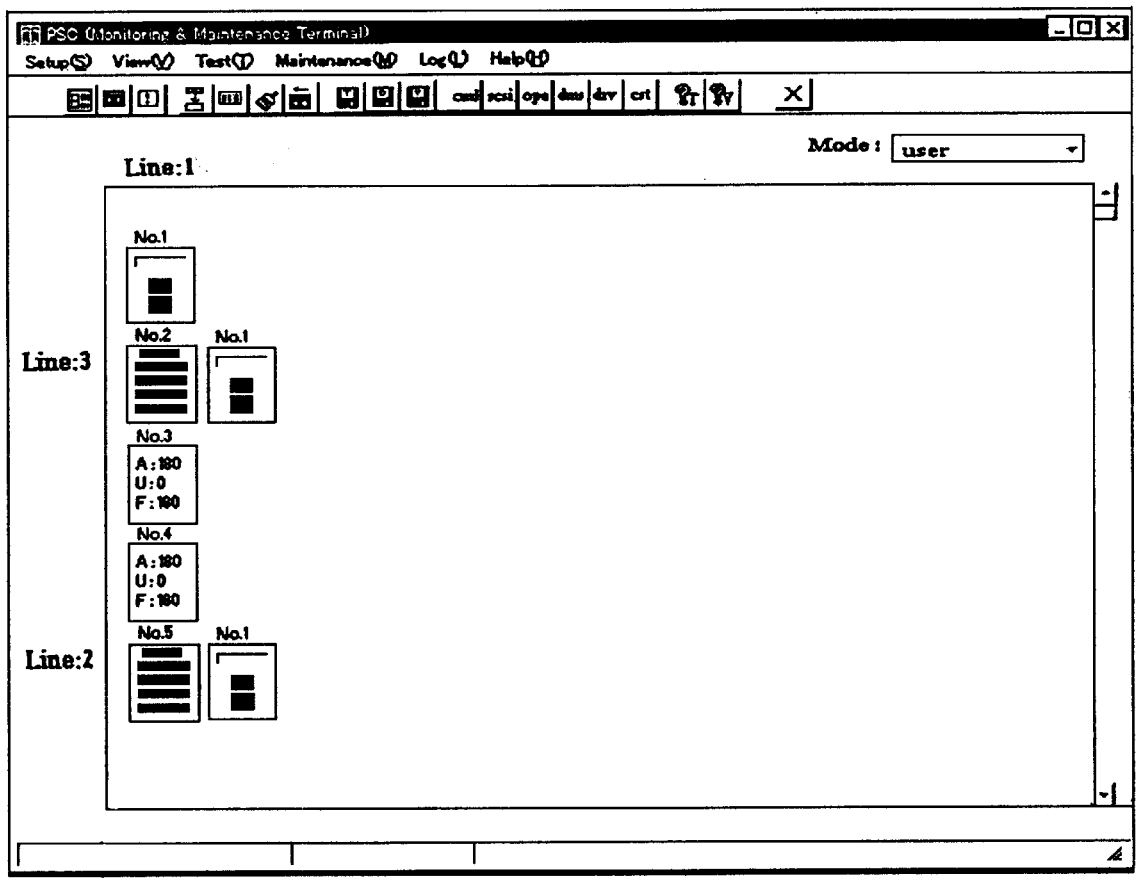
FIG. 37 is an explanatory representation of a status monitoring view in portrait in the embodiment of the invention.

For example, when "Display Type: Vertical" in the size/display type selection menu shown in FIG. 35 is selected on the status monitoring view in S size, the status monitoring view in portrait as shown in FIG. 37 is displayed. On the status monitoring view in portrait, the physical composition of the consoles is displayed so that the console line L1 as a base is disposed in the vertical direction of the view. On the status monitoring view in portrait, the connection among the consoles is also disclosed.

On the status monitoring view in landscape shown in FIG. 36, the console line L1 is disposed in the upper end of the view and the other console lines are arranged so as to extend downward from the console line L1. On the other hand, on the status monitoring view in portrait shown in FIG. 37, the console line L1 is disposed in the left end of the view and the other console lines are arranged so as to extend toward the right from the console line L1. On the status monitoring views, therefore, the connection between the consoles is displayed accurately. But it is not always accurately disclosed which side of the console line L1 the other console lines are connected to. On the status monitoring view in landscape and the status monitoring view in portrait, however, it may be possible to accurately disclose which side of the console line L1 the other console lines are connected to.

Figure 38:
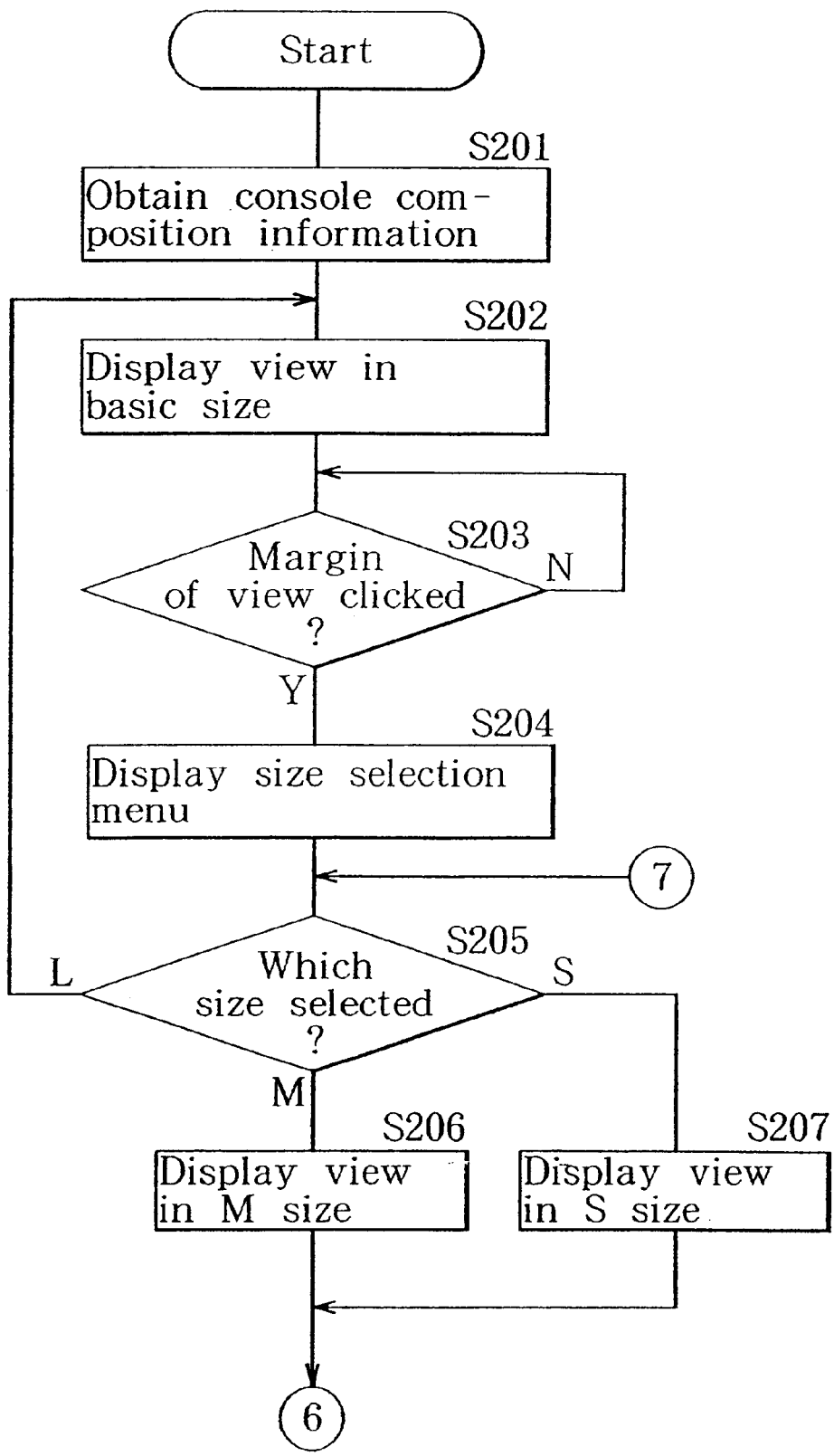
FIG. 38 is a flowchart for displaying the status monitoring view in different display manners in the embodiment of the invention.
Figure 39:
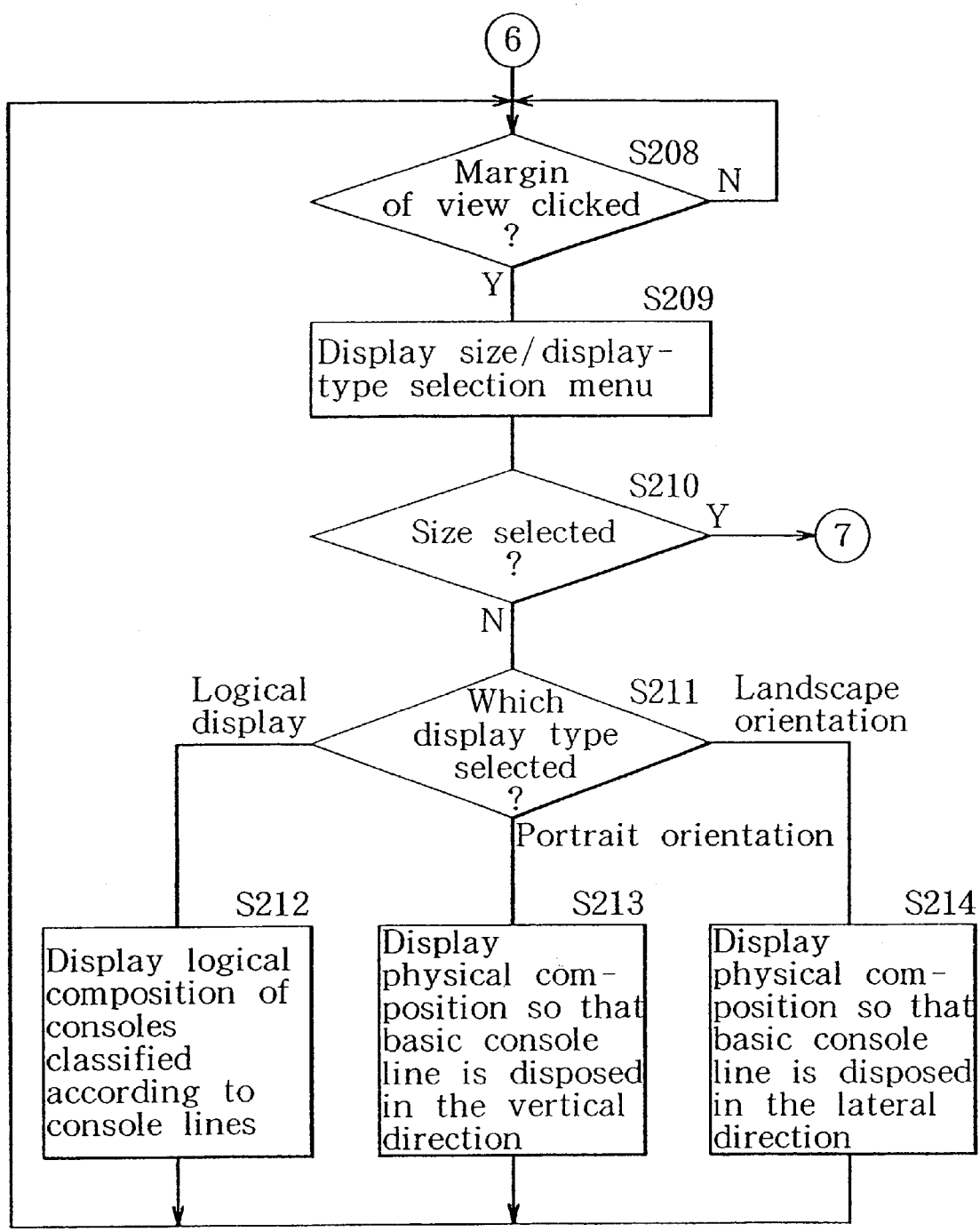
FIG. 39 is a flowchart continued from FIG. 38.

Next, description will be given with regard to the operation for displaying the status monitoring view in different display manners by the library controller 2 by referring to the flowcharts shown in FIGS. 38 and 39. FIGS. 38 and 39 show the operation starting with the activation of the library system. In the operation, first, the library controller 2 obtains the console composition information (step S201). Then the library controller 2 displays the status monitoring view in the basic size on the basis of the obtained console composition information (step S202). The library controller 2 determines whether the margin 121 of the view (refer to FIG. 13) is right-clicked or not (step S203). If the margin of the view is not rightclicked (N), the library controller 2 repeats step S203. If the margin of the view is right-clicked (Y), the library controller 2 displays the size selection menu shown in FIG. 14 (step S204). The library controller 2 then determines the size selected in the size selection menu (step S205). If "Console Size: L" is selected, the library controller 2 is returned to step S202 and displays the status monitoring view in the basic size. If "Console Size: M" is selected, the library controller 2 displays the status monitoring view in M size (step S206). If "Console Size: S" is selected, the status monitoring view is displayed in S size (step S207).

When the status monitoring view is displayed in M or S size, the library controller 2 determines whether the margin of the view is right-clicked or not (step S208). If the margin of the view is not right-clicked (N), the library controller 2 repeats step S208. If the margin of the screen is right-clicked (Y), the library controller 2 displays the size/display type selection menu shown in FIG. 35 (step S209). The library controller 2 then determines whether or not the size is selected in the size/display type selection menu (step S210). If the size is selected (Y), the library controller 2 returns to step S205. If the size is not selected (N) but the display type is selected, the library controller 2 determines the selected display type (step S211).

If the selected display type is the logical display, the library controller 2 sorts the consoles according to console lines, displays the logical composition of the consoles (step S212), and returns to step S208. If the selected display type is the portrait orientation, the library controller 2 displays the physical composition of the consoles so that the console line L1 as a base is disposed in the vertical direction of the view (step S213) and returns to step S208. If the selected display type is the landscape orientation, the library controller 2 displays the physical composition of the consoles so that the console line L1 as a base is disposed in the lateral direction of the view (step S214) and returns to step S208.

As described above, according to the embodiment, the library controller 2 selectively displays the status monitoring view in a plurality of display manners including display manners whereby the logical composition of the consoles is displayed and the display manners whereby the physical composition of the consoles is displayed. Consequently, the user can select a display manner in accordance with the purpose. The user can easily grasp both the logical composition of the consoles and the physical composition of the consoles. According to the embodiment, since at least part of the status of each part is displayed on the status monitoring view, the user can grasp the composition of the consoles, monitor the status, and easily recognize the correspondence between the status and the console.

At the time of normal control, for example, it is important to grasp the logical composition of the consoles and monitor the status of each part rather than to grasp the physical composition of the consoles. It is therefore often preferable that the display of the logical composition of the consoles be selected. Also, the logical composition of the consoles enables the whole cassette library 1 to be brought into view more readily, as compared with the case of the physical composition of the consoles. For this reason as well, the logical composition of the consoles is suitable for the display at the time of normal control.

In contrast, at the time of maintenance, it is necessary to recognize the correspondence between the status and the console and other conditions. It is therefore important to grasp the physical composition of the consoles rather than the logical composition of the consoles. Consequently, it is often preferable that the display of the physical composition of the consoles be selected at the time of maintenance. In the display of the physical composition of the consoles, the connection among the consoles is also disclosed. This enables the user to easily recognize the correspondence between the status and the console and other conditions.

In the embodiment, the display manners whereby the physical composition of the consoles is displayed includes a plurality of display manners whereby the unit arrangement direction varies. Therefore, the user can grasp the physical composition of consoles more easily. For example, when the console line L1 is longer than the other console lines, the console line L1 is often a console line which is mainly used. In such a case, when the landscape orientation is selected, the console line L1 is disposed in the lateral direction of the view. This often makes it easier to grasp the physical composition of the consoles, centering on the console line L1. On the other hand, when there is a console line longer than the console line L1, the console line longer than the console line L1 is often a console line which is mainly used. In such a case, when the portrait orientation is selected, the console line longer than the console line L1 is disposed in the lateral direction of the view. This often makes it easier to grasp the physical composition of the consoles, centering on the console line longer than the console line L1.

Figure 40:
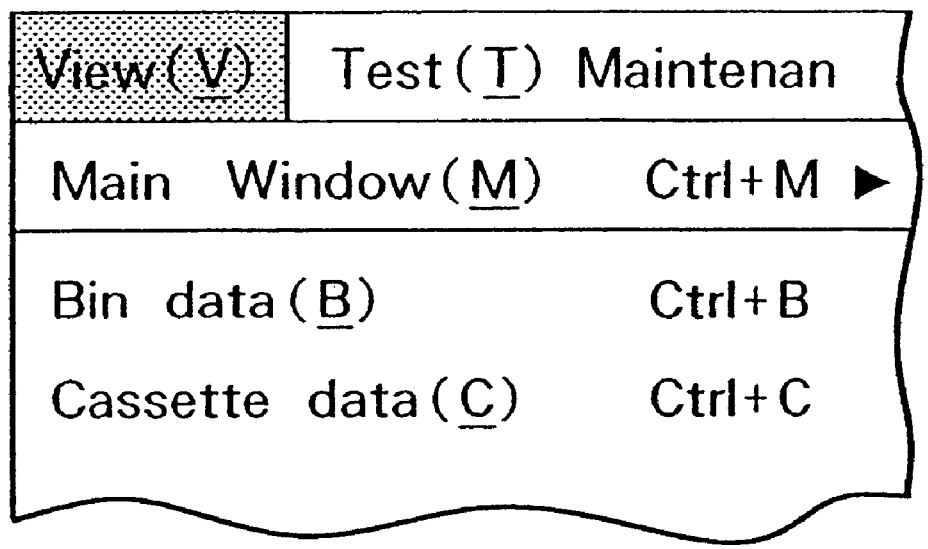
FIG. 40 is an explanatory diagram for explaining the operation for displaying the size/display type selection menu shown in FIG. 35 from a menu bar.

As already described, when the status monitoring view is displayed in M or S size, the size/display type selection menu shown in FIG. 35 is displayed by right-clicking the margin of the view. The size/display type selection menu can be also displayed from the menu bar. Specifically, as shown in FIG. 40, when the user selects (clicks the left mouse button) the option of "View" in the menu bar, a pull-down menu is displayed. When the user puts the cursor on the triangle displayed at the right end of the option of "Main Window" in the pull-down menu, the size/display type selection menu shown in FIG. 35 is displayed.

Figure 41:
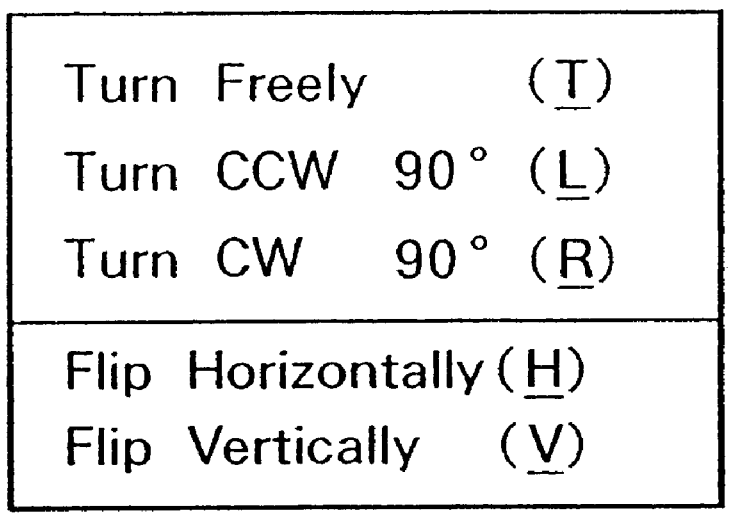
FIG. 41 is an explanatory diagram for explaining an example of the operation for changing the arrangement of consoles displayed when the portrait or landscape orientation is selected in the embodiment of the invention.

In the embodiment, the arrangement of the consoles displayed may be changed when the user selects the portrait orientation or landscape orientation. An example of the operation in such a case will be described with reference to FIG. 41. In the example, when "Display Type: Vertical" or "Display Type: Horizontal" in the size/display type selection menu shown in FIG. 35 is selected and the right mouse button is clicked, a pop-up menu shown in FIG. 41 is displayed. When "Turn Freely" in the pop-up menu is selected, a view for inputting the angle, although not shown, is displayed. When the angle is inputted on the view, the whole display image of the cassette library 1 on the view is rotated through the inputted angle. When "Turn CCW 90°" (turn 90° counterclockwise) in the pop-up menu shown in FIG. 41 is selected, the whole display image of the cassette library 1 on the view is turned 90° counterclockwise. When "Turn CW 90°" (turn 90° clockwise) in the pop-up menu shown in FIG. 41 is selected, the whole display image of the cassette library 1 on the view is turned 90° clockwise. When "Flip Horizontally" in the pop-up menu shown in FIG. 41 is selected, the arrangement of the consoles on the view is flipped horizontally. When "Flip Vertically" in the pop-up menu shown in FIG. 41 is selected, the arrangement of the consoles on the view is flipped vertically.

Description will now be made in detail of a process for creating a system file. The process for creating a system file is a process for combining a plurality of items of management information for each block, which is necessary for system management and classified according to functions or components of the system, into a system information file. Examples of management information are version information of a recording and reproducing apparatus or other apparatuses such as a VCR mounted in the drive console, and version information of software which provides a program to realize the function of controlling the system.

Figure 42:
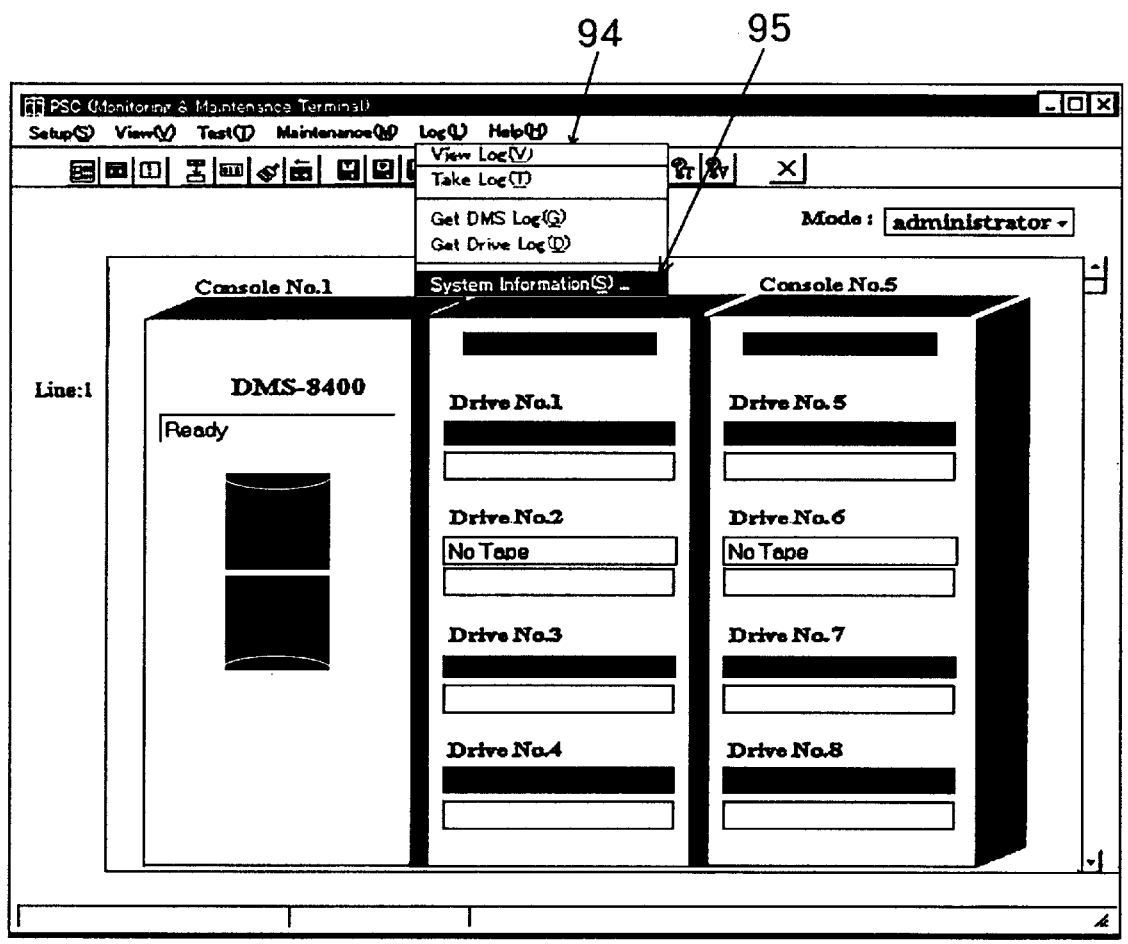
FIG. 42 is an explanatory representation of a selection menu displayed in the library controller illustrated in FIG. 1.

As described above, by storing the created system information file in the hard disk of the library controller 2, the user can allow the system information to be displayed on the display device 23 and refer to the information for system management as necessary. When the system information file is needed, the user selects "Log" menu in the menu bar with the mouse or the like on the view for control shown in FIG. 42. Then the user selects "System Information" menu 95 in a pull-down menu 94. "System Information" menu 95 is a menu used to instruct to form a system information file. Selecting the "System Information" menu 95 makes the library controller 2 perform the process for creating a system information file. In the process for creating a system information file, the library controller 2 performs the following process: collecting system information as a plurality of items of management information classified according to functions or components of the library system for each function or component, combining a plurality of items of collected system information into data in a form which can be outputted in an integrated manner, and recording the data as a single system information file onto, for example, a hard disk. The process for creating a system information file by the library controller 2 causes a plurality of items of system information to be rearranged into one system information file. The user can allow data of a system information file recorded on a hard disk to be displayed on, for example, the display device 23 and refer to the data for the system manager. When a system information file is recorded onto a hard disk, the library controller 2 can give a predetermined file name (for example, file name of "Sysinfo.txt") to the file, and assign the date and time of the creation thereof, serial number of the file as the version of the file and other information to the file. When there is a system information file which has been recorded in the past in the hard disk, the past system information file is also kept. In this case, a newly created system information file may be written over the past system information file.

The library controller 2 also performs the process for creating a system information file in the cases, as for example where "Take Log" menu in the pull-down menu 94 is selected and an instruction to obtain a log, i.e. information on past operation progression of the system, is given. In this case, the library controller 2 obtains the system log, creates a log file as a system information file in a form of being storable to a removable recording medium such as a floppy disk, and attaches the system information file created by the process for creating a system information file to the created log file. Further, the library controller 2 also performs the process for creating a system information file in the cases, as for example where, in response to an instruction from the user, a position sensor, although not shown, performs the process for detecting the position accessed by the cassette carrier 16 in the cassette library 1 and the system information is updated.

The invention is not limited to the foregoing embodiment. For example, the invention can be also applied to a library system using various recording media such as a cassette-shaped recording medium other than a video tape cassette and a disk-shaped recording medium.

The library controller 2 may perform the process for creating a system information file in response to an instruction from the host computer 3.

Figure 43:
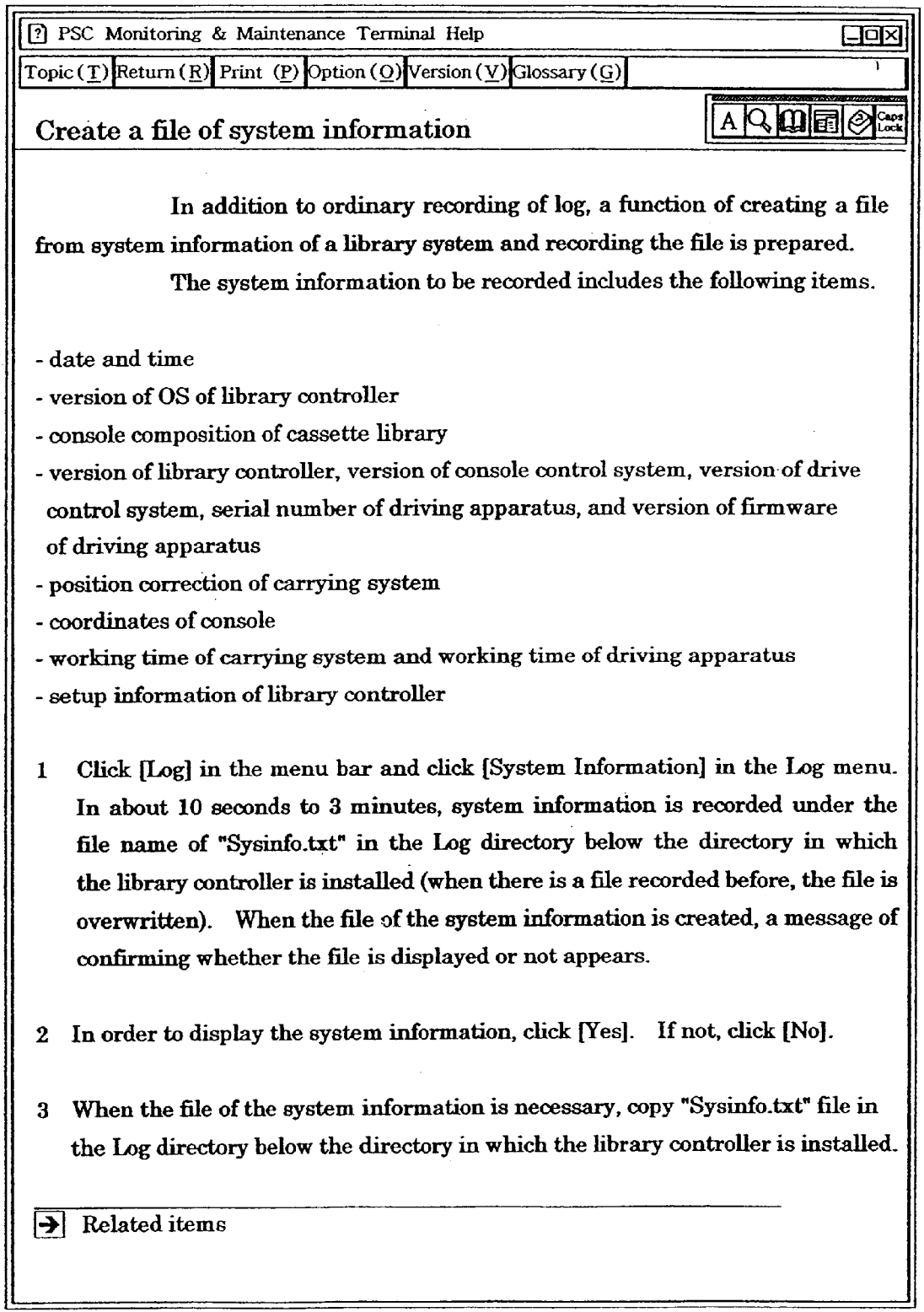
FIG. 43 is an explanatory representation of an image for explaining a system information file displayed in the library controller illustrated in FIG. 1.

FIG. 43 shows a help view for explaining the process for creating a system information file on the display device 23 of the library controller 2. The help view is displayed as a view for reference as necessary when the user gives instructions to perform the process for creating a system information file.

FIGS. 44 and 45 are explanatory representations of an example of a data structure of a system information file created by the library controller 2. FIGS. 44 and 45 illustrate a series of data included in a single system information file. The system information collected by the library controller 2 includes information on the date and time of the collection of system information and the version of the OS (Operating System) of the library controller 2. In the system information file, the above information is positioned at the head of data, as shown in FIG. 44. The system information includes information on the console composition of the cassette library 1, version of the library controller 2, version of the console control system, version of the drive control system, serial number of the driving apparatus 13, version of firmware of the driving apparatus 13, position correction of a carrying system, coordinates of the consoles, working time of the carrying system, working time of the driving apparatus 13, set-up of the library controller 2, and the like.

The information on the console composition includes information on the type of the cassette library 1 and information on the console composition. The information on the version of the library controller 2 includes information on the version of the whole library controller and the version of each program module in the library controller 2. The information on the version of the console control system includes information on the version of the console control unit 62 (see FIG. 5), the self diagnosis result thereof, the version of a board for control in another console control system, and the self diagnosis result thereof. The information on the version of the drive control system includes information on the version of each of the main drive control units 61 and 81 (see FIGS. 5 and 6) and the version of each of the drive control units 70. The information on the working time of the carrying system and the working time of the driving apparatus 13 includes information on working time/the number of accesses made by the cassette carrier 16 of each console line, information on working time of the input/output port, and information on working time of the junction port.

The information on the position correction of the carrying system and the coordinates of the consoles is, for example, information obtained by an initial process such as detection of the position accessed by the cassette carrier 16 by the position sensor (not shown) in the cassette library 1.

The operation of the library controller 2 related to the process for creating a system information file will be described by referring to the flowcharts shown in FIGS. 46 and 47.

Figure 46:
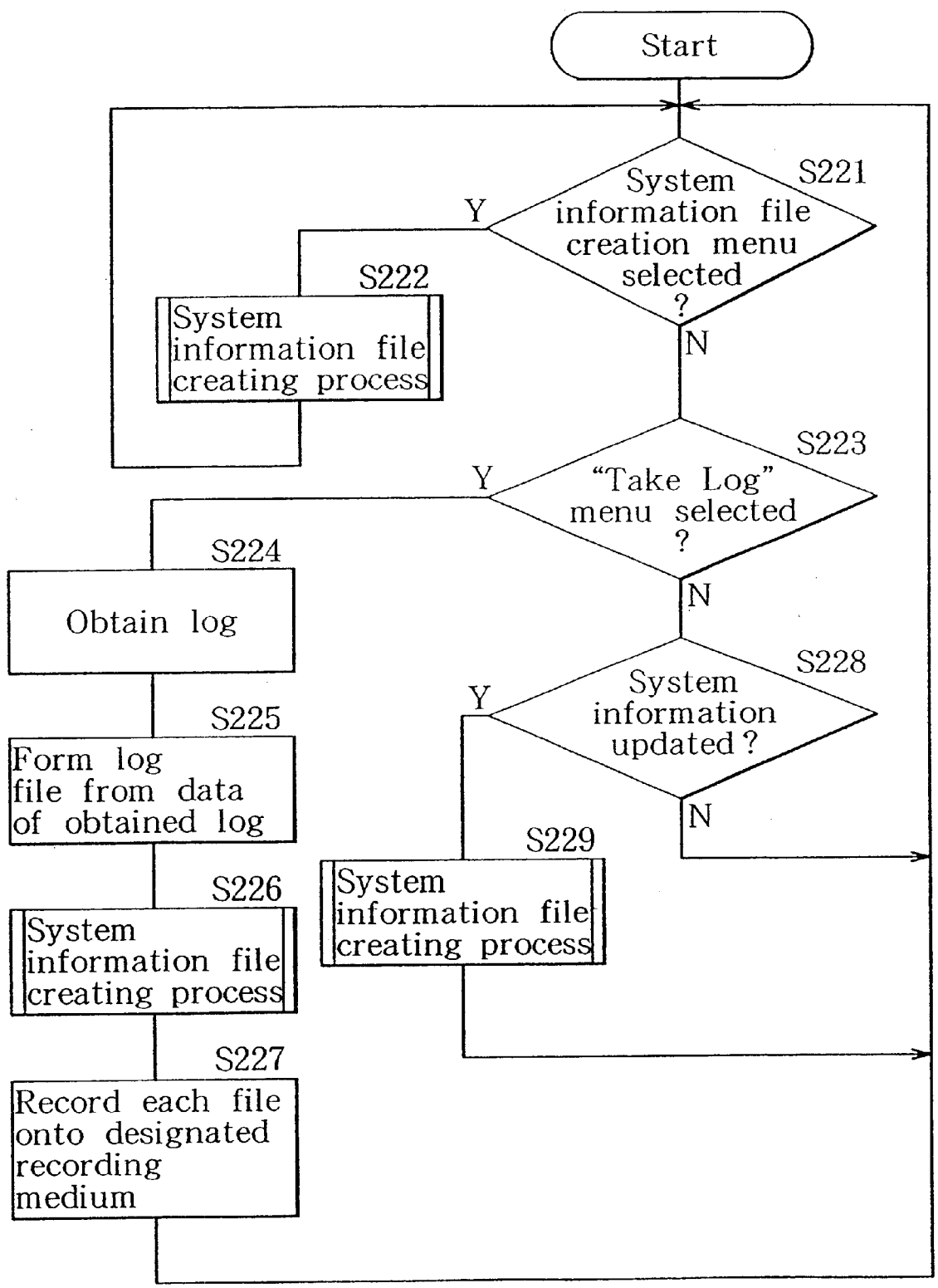
FIG. 46 is a flowchart for explaining a main operation accompanied by a process for creating a system information file in the embodiment of the invention.

FIG. 46 is a flowchart for explaining a main operation accompanied by the process for creating a system information file. In the operation, the library controller 2 determines whether or not the "System Information" menu 95 for instructing the creation of a system information file in the pull-down menu 94 (see FIG. 42) is selected by the user on the main view shown in FIG. 7 (step S221). If the "System Information" menu 95 for instructing the creation of a system information file is selected (Y), the library controller 2 performs the process for creating a system information file shown in FIG. 47 (step S222) and returns to step S221.

If the "System Information" menu 95 for instructing the creation of a system information file is not selected (step S221: N), the library controller 2 determines whether or not the "Take Log" menu for instructing the capture of the log in the pull-down menu 94 is selected (step S223). If the "Take Log" menu for instructing the capture of the log is selected (Y), the library controller 2 obtains the log information on the past operation progression of the system (step S224) and forms a log file by using the captured log information as data in a form of being storable to a removable recording medium such as a floppy disk (step S225). Further, after creating a system information file through the process for creating a system information file shown in FIG. 47 (step S226), the library controller 2 attaches the system information file to the log file, records both of the files to a recording medium such as a floppy disk (step S227) and returns to step S221.

On the other hand, when the "Take Log" menu for instructing the capture of the log is not selected (step S223: N), the library controller 2 determines whether the system information has been updated or not (step S228), for example, as a result of an initial process for detecting the position accessed by the cassette carrier 16 in the cassette library 1 by the position sensor (not shown), or other processes. If it is determined that the system information has not been updated (N), the library controller 2 returns to step S221. If it is determined that the system information has been updated (step S228: Y), the library controller 2 performs the process for creating a system information file shown in FIG. 47 and then returns to step S221.

Figure 47:
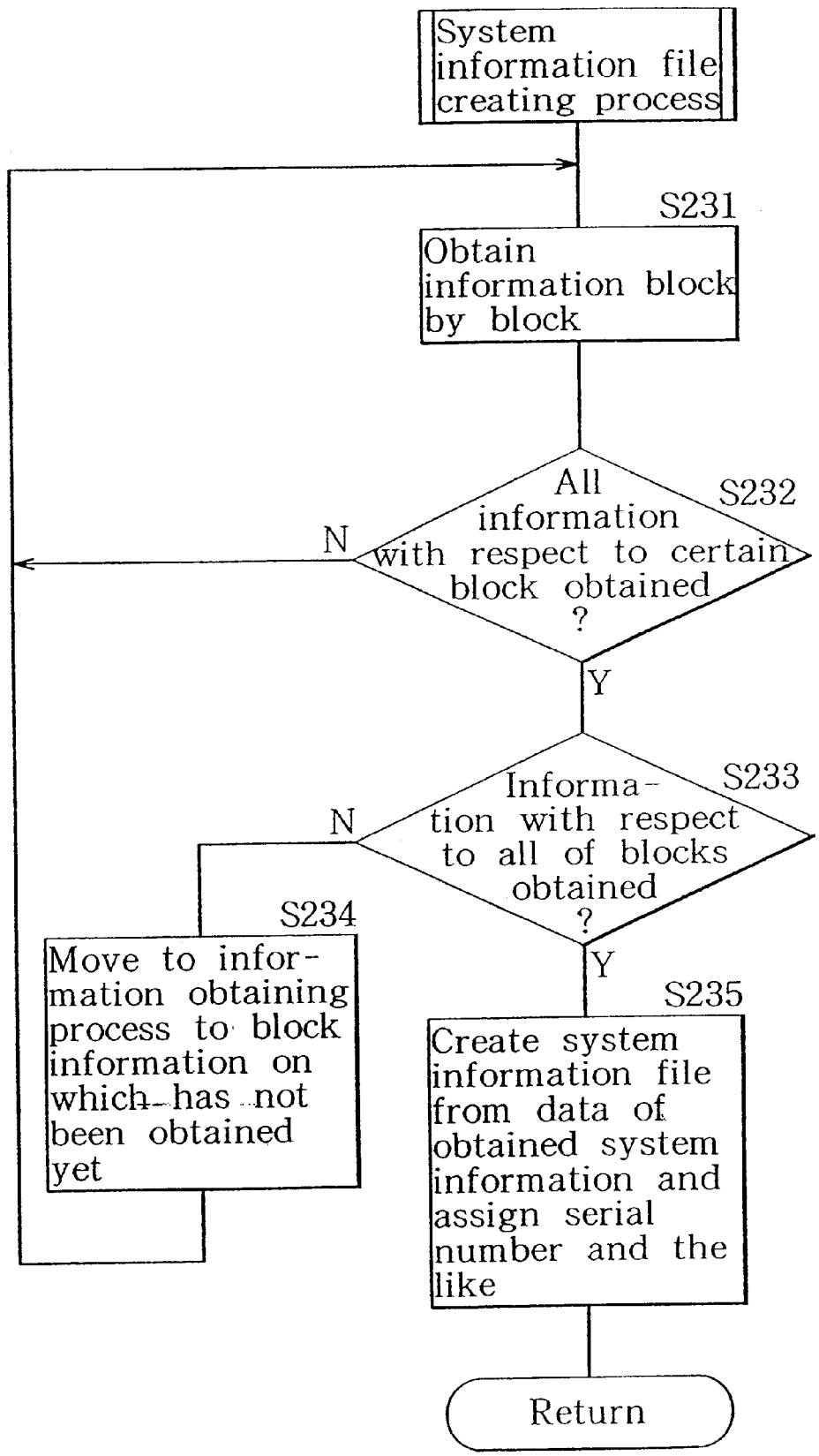
FIG. 47 is a flowchart for explaining the process for creating the system information file in FIG. 46.

FIG. 47 is a flowchart for explaining the process for creating a system information file. First, the library controller 2 executes a process of obtaining a plurality of items of system information classified according to functions or components of the library system for each block (step S231). The library controller 2 determines whether all of the system information on a certain block has been obtained or not (step S232). If it is determined that some system information on a certain block has not been obtained (N), the library controller 2 returns to step S231.

On the other hand, if it is determined that all of the system information on a certain block has been obtained (step S232: Y), the library controller 2 determines whether or not the information with respect to all of the blocks has been obtained (step S233). If it is determined that the information on some blocks has not been obtained yet (N), the library controller 2 moves on to the process for obtaining information with respect to a block, information on which has not been obtained (step S234) and returns to step S231.

If it is determined that information with respect to all of the blocks is obtained (step S233: Y), the library controller 2 rearranges a plurality of items of obtained system information into data in a form which can be outputted in an integrated manner and records the data as a single system information file onto a hard disk (step S235). When recording the file, the library controller 2 may give a predetermined file name to the file, assign the date and time of the creation thereof, serial number of the file as the version of the file, and other information to the file. After performing the process for creating a system information file as described above, the library controller 2 returns to the main operation shown in FIG. 46 accompanied by the process for creating a system information file.

As described above, according to the recording medium library apparatus or its operating method of the invention, there are provided a unit combination constituted by combining a plurality of kinds of units including a unit having recording and reproducing means for performing at least either recording or reproduction of information by using a removable recording medium and a unit having a plurality of housing sections in which the recording medium can be housed, and connecting the units to one another so as to be able to change the position thereof; carrying means for carrying the recording medium between any one of the housing sections in the unit combination and the recording and reproducing means; and control means for controlling the recording and reproducing means and the carrying means and performing various information processing related to the working of the whole apparatus. Consequently, in the recording medium library apparatus constructed by combining a plurality of units, information useful for operation and maintenance management can be easily obtained.

Especially, in a mode (aspect) of the invention, the apparatus composition including the kind of each unit and the connection among the units is recognized and an image which represents the recognized composition is outputted. Therefore, an image which represents the composition of the recording medium library apparatus can be easily outputted.

In another mode of the invention, when the image which represents the apparatus composition being outputted, the image is selectively displayed in a plurality of display manners. In addition to the above effects, therefore, the user can select a display manner in accordance with the purpose.

In still another mode of the invention, the display manners include display manners whereby the size of display images of the units varies. This enables the user to easily grasp both the composition of the whole recording medium library apparatus and the composition of part of the recording medium library apparatus.

In still another mode of the invention, the status of each of the recording and reproducing means, the housing sections and the carrying means is recognized and at least part of information on the recognized status is outputted together with the image which represents the composition. Thus, the user can grasp the composition of the recording medium library apparatus and also monitor the status.

In still another mode of the invention, when the image which represents the apparatus composition being outputted, either the image or information on status is selectively displayed in a plurality of display manners. The user can selectively display the image which represents the composition or the information on status in a plurality of display manners according to the purpose.

In still another mode of the invention, in response to a designation of a position in the image which represents the composition, detailed information on the status related to the designated position is outputted. Consequently, the user can promptly and easily monitor both the whole apparatus in outline by using the image which represents the composition and part of the apparatus in detail by using the detailed information.

In still another mode of the invention, the display manners include display manners whereby a display of logical composition of the units is produced and display manners whereby a display of physical composition of the units is produced. Consequently, the user can easily grasp both the logical composition of the units and the physical composition of the units.

In still another mode of the invention, the display manners whereby a display of the physical composition of the units is produced includes display manners whereby the unit arrangement direction varies. Consequently, the user can grasp the physical composition of the units more easily.

In still another mode of the invention, a plurality of items of management information classified according to functions or components of the recording medium library apparatus are collected and the collected management information is put together into information in a form which can be outputted in an integrated manner. Thus, a plurality of items of management information can be easily obtained in an integrated manner.

In still another mode of the invention, when the log of the recording medium library apparatus being obtained and the obtained log being rearranged in a form which can be outputted, the management information is collected and put together into information in a form which can be outputted in an integrated manner and the resultant information is attached to the log. Consequently, for example, at the time of analysis of the log performed when a failure occurs in the apparatus, the management information can be easily referred to. Therefore, a failure analysis and the like can be easily performed.

Obviously many modifications and variations of the present invention are possible in the light of the above teachings. It is therefore to be understood that within the scope of the appended claims that invention may be practiced otherwise than as specifically described.

What is claimed is:

1. A recording medium library apparatus, comprising:

a recording medium library composed of a plurality of connected consoles, including at least a basic console for importing and exporting recording medium to the library apparatus, a drive console for recording and reproducing information on the recording medium, and a recording medium console for storing recording medium; each console having a composition information transmitting unit for transmitting composition information corresponding to that console; the basic console having a composition obtaining unit for obtaining composition information transmitted from each console, whereby the basic console obtains composition information for the entire recording medium library;

carrying means for transferring recording medium between the consoles in the cassette library; and a library controller for controlling the library apparatus, receiving composition information from the basic console, generating a system information file from the received composition information, and displaying an image on the basis of the system information file representing the composition of the library apparatus.

2. The recording medium library apparatus according to claim 1, wherein the recording medium library further includes at least one junction console for connecting consoles to allow for the transfer of recording medium and information between connected consoles.

3. The recording medium library apparatus according to claim 2, wherein each junction console has a composition obtaining unit for obtaining composition information transmitted from each console, and the basic console also obtains composition information from each junction console.

4. The recording medium library apparatus according to claim 1, wherein the image displayed by the library controller is configurable by a viewer.

5. The recording medium library apparatus according to claim 1, wherein the recording medium is a tape cassette medium.

6. The recording medium library apparatus according to claim 1, wherein each recording medium console has a plurality of housing shelves for storing the recording medium.

7. The recording medium library apparatus according to claim 1, wherein the carrying means has a bar-code reader for identifying respective recording medium.

8. The recording medium library apparatus according to claim 1, wherein the carrying means communicates with the consoles in the recording medium library via infrared signals.

* * * * *